(12) United States Patent
Cho

(10) Patent No.: US 9,239,701 B2
(45) Date of Patent: *Jan. 19, 2016

(54) ELECTRONIC DEVICE AND METHOD OF CONTROLLING THE SAME

(71) Applicant: LG ELECTRONICS INC., Seoul (KR)

(72) Inventor: Eunhyung Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/203,048

(22) Filed: Mar. 10, 2014

(65) Prior Publication Data

US 2014/0195027 A1 Jul. 10, 2014

Related U.S. Application Data

(63) Continuation of application No. 13/462,530, filed on May 2, 2012, now Pat. No. 8,843,226.

(60) Provisional application No. 61/606,475, filed on Mar. 5, 2012.

(51) Int. Cl.
*G06F 17/00* (2006.01)
*G06F 3/16* (2006.01)
*H04M 1/725* (2006.01)

(52) U.S. Cl.
CPC *G06F 3/16* (2013.01); *G06F 17/00* (2013.01); *H04M 1/72533* (2013.01); *H04M 1/72558* (2013.01); *H04M 2250/22* (2013.01)

(58) Field of Classification Search
CPC .......... H04M 1/72527; H04N 21/4122; H04N 21/43615; H04N 21/4126; H04N 2005/4423; H04N 5/44513; H04N 5/44582
See application file for complete search history.

(56) References Cited

U.S. PATENT DOCUMENTS

| 5,867,223 | A | 2/1999 | Schindler et al. | |
|---|---|---|---|---|
| 8,290,537 | B2 | 10/2012 | Lee et al. | |
| 8,706,279 | B2 * | 4/2014 | Cho | 700/94 |
| 8,843,226 | B2 * | 9/2014 | Cho | 700/94 |
| 2002/0102949 | A1 | 8/2002 | Langer | |
| 2005/0186988 | A1 | 8/2005 | Lim et al. | |
| 2007/0004472 | A1 | 1/2007 | Gitzinger | |
| 2009/0131120 | A1 | 5/2009 | Park et al. | |

(Continued)

FOREIGN PATENT DOCUMENTS

| KR | 10-0709986 B1 | 4/2007 |
|---|---|---|
| KR | 10-2009-0120712 A | 11/2009 |

(Continued)

*Primary Examiner* — Andrew C Flanders
(74) *Attorney, Agent, or Firm* — Birch, Stewart, Kolasch & Birch, LLP

(57) ABSTRACT

An electronic device connected to at least one external electronic device, the electronic device including a communication unit configured to perform data communication with the at least one external electronic device, an interface unit configured to connect to a sound output device, and a controller configured to receive audio data when the sound output device is connected to the electronic device through the interface unit, the audio data associated with a first external electronic device outputting a second content associated with a first content being output through the electronic device from the first external electronic device, and to output the received audio data through the sound output device.

26 Claims, 20 Drawing Sheets

(56) References Cited

U.S. PATENT DOCUMENTS

2011/0188669 A1    8/2011   Lu
2011/0231872 A1    9/2011   Gharachorloo et al.

FOREIGN PATENT DOCUMENTS

KR    10-2010-0065478 A    6/2010
KR    10-2011-0010376 A    2/2011

* cited by examiner

ELECTRONIC DEVICE AND METHOD OF CONTROLLING THE SAME

CROSS REFERENCE TO RELATED APPLICATIONS

This nonprovisional application is a Continuation of co-pending U.S. patent application Ser. No. 13/462,530 filed on May 2, 2012, which claims the benefit of priority to U.S. Provisional Application No. 61/606,475 filed on Mar. 5, 2012. The entire contents of the above applications are hereby incorporated by reference.

BACKGROUND OF THE INVENTION

1. Field of Invention

Embodiments of the present invention are directed to an electronic device connected to at least one other electronic device, which allows a user to easily notice audio data generated from the electronic device and the other electronic device and a method of controlling the electronic device.

2. Discussion of the Related Art

The advancement of hardware and software technologies and combination of networks enable various communications between electronic devices while diversifying the use of the electronic devices.

Accordingly, a need exists for a more user-friendly user interface (UI) for electronic devices that may perform communication with external electronic devices. Also, various methods are needed to allow a user to efficiently control an electronic device so that he/she can enjoy various contents through multiple electronic devices (for example, 3-screen play or 5-screen play).

SUMMARY OF THE INVENTION

Embodiments of the present invention provide an electronic device that can more efficiently output audio data generated from multiple electronic devices connected to one another to a user and a method of controlling the electronic device.

According to an embodiment, there is provided an electronic device connected to at least one external electronic device, the electronic device including a communication unit configured to perform data communication with the at least one external electronic device, an interface unit configured to connect to a sound output device, and a controller configured, when the sound output device is connected to the electronic device through the interface unit, to receive audio data associated with a first electronic device outputting a second content associated with a first content being output through the electronic device from the first electronic device and to output the received audio data through the sound output device.

The controller is configured, when the sound output device is connected to the electronic device, to transmit a first message to the first electronic device, the first message indicating the connection of the sound output device.

The controller is configured to determine the first electronic device outputting the second content among the at least one external electronic device.

The controller is configured to, among the at least one external electronic device, determine an electronic device streaming the first content to the electronic device as the first electronic device.

The controller is configured to, among the at least one external electronic device, determine an electronic device providing access information for accessing the first content as the first electronic device.

The controller is configured to transmit a second message to the at least one external electronic device, wherein the second message includes information on the first content, and wherein the controller is configured, when receiving a response message in response to the second message, to determine an electronic device transmitting the response message as the first electronic device.

The first content includes metadata for the second content.

The received audio data includes encoded audio data.

The controller is configured, when the output of the first content associated with the second content is stopped, to continue to receive the audio data associated with the first electronic device and to output the received audio data through the sound output device.

The controller is configured, when the output of the first content associated with the second content is stopped, to provide a user interface to determine whether to continue to receive the audio data associated with the first electronic device.

According to an embodiment, there is provided an electronic device connected to at least one external electronic device, the electronic device including a communication unit configured to perform data communication with the at least one external electronic device, a sound output module, and a controller configured to transmit audio data corresponding to a first content to a first electronic device outputting a second content associated with the first content among the at least one external electronic device through the communication unit when sensing a connection of a sound output device to the first electronic device while outputting the audio data through the sound output module.

The controller is configured to stream the second content to the first electronic device through the communication unit.

The controller is configured to transmit access information for accessing the second content to the first electronic device through the communication unit.

The transmitted audio data includes encoded audio data.

The controller is configured to stop outputting the audio data when transmitting the audio data to the first electronic device.

The controller is configured to display an indicator through a display module to indicate that the audio data is transmitted to the first electronic device when transmitting the audio data to the first electronic device.

According to an embodiment, there is provided a method of controlling an electronic device connected to at least one external electronic device, the method including sensing a connection of a sound output device to the electronic device, receiving audio data associated with a first electronic device outputting a second content associated with a first content being output by the electronic device from the first electronic device when the sound output device is connected to the electronic device, and outputting the received audio data through the sound output device.

The method further includes identifying the first electronic device among the at least one external electronic device.

Identifying the first electronic device includes determining as the first electronic device an electronic device streaming the first content to the electronic device among the at least one external electronic device.

Identifying the first electronic device includes determining as the first electronic device an electronic device providing access information for accessing the first content among the at least one external electronic device.

The first content includes metadata for the second content.

The received audio data includes encoded audio data.

The embodiments of the present invention provide the following effects.

A user who simultaneously uses a plurality of electronic devices (for example, smartphone and TV) may easily obtain the audio data associated with the plurality of electronic devices through a sound output device (e.g., earphone) connected to one electronic device (e.g., smartphone).

Without the need for switching on all of the electronic devices to obtain audio data from the electronic devices, a user may receive the audio data from all the electronic devices through an earphone connected to one of the electronic devices, thus preventing other users from being annoyed by the audio data generated from the electronic devices.

Rather than connecting an earphone to a television or PC, a user may connect the earphone to a portable electronic device, such as a smartphone, which is physically or wirelessly connected to the TV or PC, to receive audio data generated from the television or PC.

According to the embodiments, audio data of a particular one of a plurality of electronic devices networked to a corresponding electronic device may be pulled and output, the particular electronic device being associated with the corresponding electronic device. This may eliminate any inconvenience that causes a user to pull and output unnecessary audio data.

BRIEF DESCRIPTION OF THE DRAWINGS

The embodiments of the present invention will become readily apparent by reference to the following detailed description when considered in conjunction with the accompanying drawings wherein.

DESCRIPTION OF THE EMBODIMENTS

Figure 1:
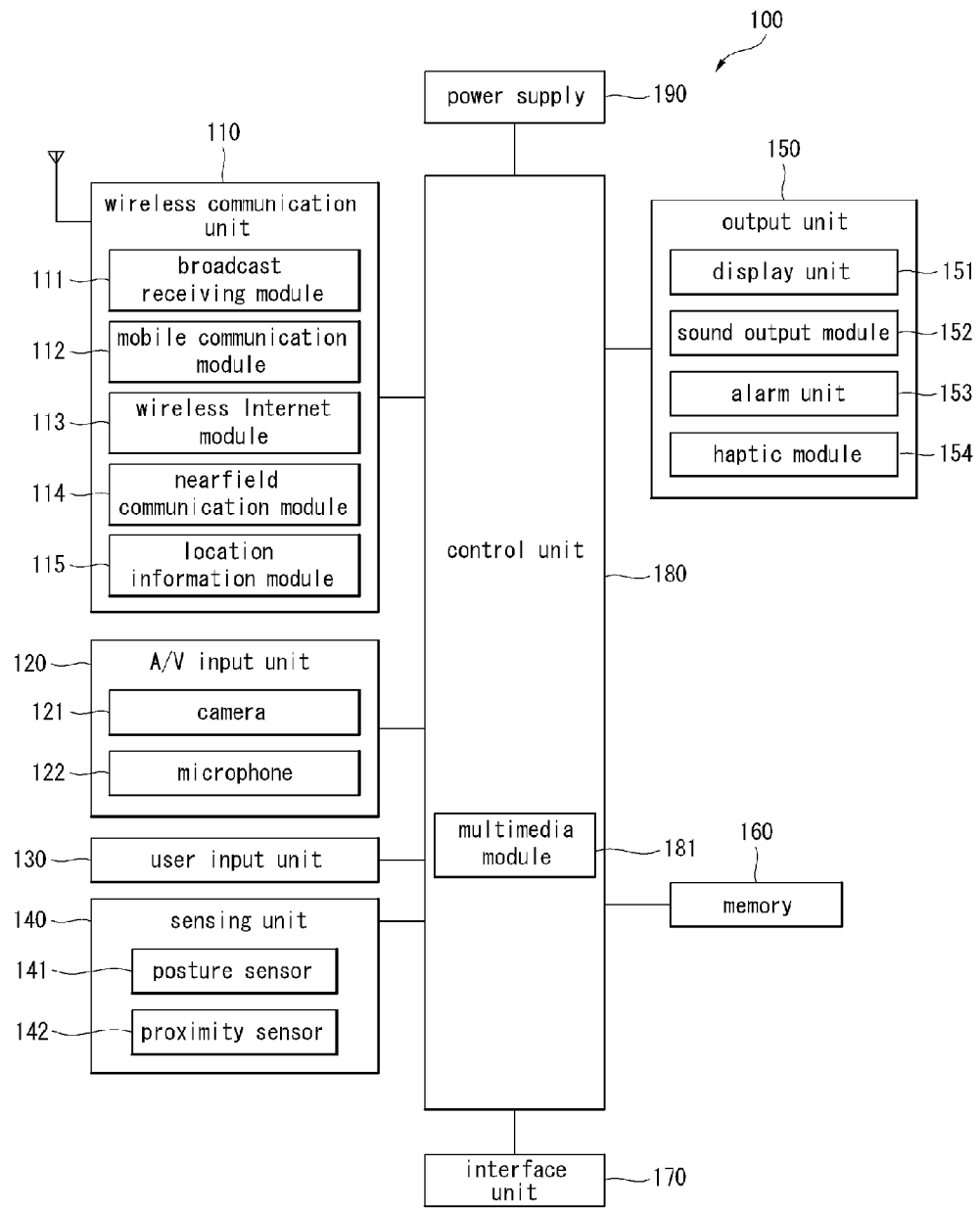
FIG. 1 is a block diagram illustrating an electronic device according to an embodiment of the present invention.

The embodiments of the present invention will be apparent from the detailed description with reference to the accompanying drawings. However, the embodiments of the present invention are not limited thereto, and diverse variations or modifications to the embodiments may be made.

In the drawings, the thickness of the layer or region may be exaggerated for clarity. It will be understood that when an element or layer is referred to as being "on" another element or layer, it can be directly on the other element or layer or intervening elements or layers may be present. Like numbers may refer to like or similar elements throughout the specification and the drawings.

When determined to render the gist of the present invention unnecessarily unclear, the specific description on known functions or configurations will be omitted. As used herein, the number (for example, first, second, . . . ) is used only to distinguish one component from another.

In the following description, suffixes "module" and "unit" are given to components of the mobile terminal in consideration of only facilitation of description and do not have meanings or functions discriminated from each other.

As used herein, the electronic device may include a stationary type terminal, such as a digital TV or a desktop computer, as well as a mobile terminal, such as a cellular phone, a smart phone, a laptop computer, a digital broadcast terminal, a PDA (Personal Digital Assistant), a PMP (Portable Multimedia Player), or a navigation system.

FIG. 1 is a block diagram illustrating an electronic device according to an embodiment of the present invention.

The electronic device 100 includes a wireless communication unit 110, an A/V (Audio/Video) input unit 120, a user input unit 130, a sensing unit 140, an output unit 150, a memory 160, an interface unit 170, a control unit 180, and a power supply 190. The components shown in FIG. 1 are not necessary, and according to an embodiment, more or less components may be included in the electronic device 100.

Hereinafter, each component is described more specifically.

The wireless communication unit 110 may include one or more modules that enable wireless communication between the electronic device 100 and a wireless communication system or between the electronic device 100 and a network in which the electronic device 100 is positioned. For instance, the electronic device 100 may include a broadcast receiving module 111, a mobile communication module 112, a wireless Internet module 113, a near field communication module 114, and a location information module 115.

The broadcast receiving module 111 receives broadcast signals and/or broadcast-related information from an external broadcast management server through broadcast channels.

The broadcast channels include satellite channels or terrestrial channels. The broadcast management server may include a server that generates and transmits broadcast signals and/or broadcast-related information or receives pre-generated broadcast signals and/or broadcast-related information and transmits the signals and information to a terminal. The broadcast signals may include TV broadcast signals, radio broadcast signals, and data broadcast signals, as well as broadcast signals including combinations of TV broadcast signals or radio broadcast signals and data broadcast signals.

The broadcast-related information may include information relating to broadcast channels, broadcast programs or broadcast service providers. The broadcast-related information may be provided through a mobile communication network and may be received through the mobile communication module 112.

Various types of broadcast-related information may be provided, such as EPG (Electronic Program Guide) of DMB (Digital Multimedia Broadcasting) or ESG (Electronic Service Guide) of DVBH (Digital Video Broadcast Handheld).

The broadcast receiving module 111 receives broadcast signals (e.g., digital broadcast signals) through various broadcast systems, such as, for example, DMBT (Digital Multimedia Broadcasting Terrestrial), DMBS (Digital Multimedia Broadcasting Satellite), MediaFLO (Media Forward Link Only), DVBH (Digital Video Broadcast Handheld), ISDBT (Integrated Services Digital Broadcast Terrestrial), or other digital broadcast systems. The broadcast receiving module 111 may be configured to fit for any other broadcast system providing broadcast signals as well as the above-listed digital broadcast systems.

The broadcast signals and/or broadcast-related information received through the broadcast receiving module 111 may be stored in the memory 160.

The mobile communication module 112 transmits and receives wireless signals to/from at least one of a base station, an external terminal, and a server over a mobile communication network. The wireless signals may include voice call signals, video call signals, various types of data based on transmission/reception of text/multimedia messages.

The wireless Internet module 113 may include modules that can access the Internet wirelessly. The wireless Internet module 113 may be provided inside or outside the electronic device 100. Various types of wireless technologies may be used, such as WLAN (Wireless LAN) (WiFi), Wibro (Wireless broadband), Wimax (World Interoperability for Microwave Access), or HSDPA (High Speed Downlink Packet Access).

The near field communication module 114 may include modules for near-field communication. Various near-field communication technologies may be employed, such as Bluetooth, RFID (Radio Frequency Identification), IrDA (infrared Data Association), UWB (Ultra Wideband), ZigBee, or WiHD, WiGig.

The location information module 115 may include a module for identifying a position of the electronic device or for obtaining the information on the position. A representative example of the location information module 115 includes a GPS (Global Position System) module. The GPS module 115 may yield three-dimensional location information based on the longitude, latitude, and altitude of one position (object) at one time by obtaining information on distances between the position (object) and three or more satellites and information on time when the distance information is obtained followed by triangulation. Further, the location information module 115 may obtain information on the position and time using three satellites and correct the obtained information using another satellite. The location information module 115 may produce the current position in real time and calculate the speed information using the current position.

Referring to FIG. 1, the A/V input unit 120 may include a camera 121 and a microphone 122 to receive audio or video signals. The camera 121 processes picture frames such as still images or video images obtained by an image sensor in a video call mode or image capturing mode. The processed picture frames may be displayed on the display unit 151.

The picture frames processed by the camera 121 may be stored in the memory 160 or externally transmitted through the wireless communication unit 110. Two or more cameras 121 may be provided depending on configuration of the terminal.

The microphone 122 receives external sound signals in a call mode, recording mode, or voice recognition mode and processes the received signals into electrical sound data. In the case of the call mode, the sound data may be converted into transmittable form and output to a mobile base station through the mobile communication module 112. The microphone 122 may include various noise cancelling algorithms to eliminate noise that is created while receiving external sound signals.

The user input unit 130 generates input data for a user to control the operation of the terminal. The user input unit 130 may include a key pad, a dome switch, a touch pad (resistive/capacitive), jog wheel, or a jog switch.

The sensing unit 140 may sense the current state of the electronic device 100, such as the opening/closing state of the electronic device 100, position of the electronic device 100, presence or absence of user's contact, orientation of the electronic device 100, or acceleration/deceleration of the electronic device 100 and generates sensing signals for controlling the operation of the electronic device 100. For instance, in the case that the electronic device 100 is a sliding phone, the sensing unit 140 may sense whether to open or close the sliding phone. Further, the sensing unit 140 may also sense whether the power supply 190 supplies power or whether the interface unit 170 is coupled with an external device. The sensing unit 140 may include a posture sensor 141 and/or proximity sensor 142.

The output unit 150 is provided to generate visual, audible, or tactile outputs. The output unit 150 may include a display unit 151, a sound output module 152, an alarm unit 153, and a haptic module 154.

The display unit 151 displays information processed by the electronic device 100. For example, in the case that the electronic device 100 is subjected to the call mode, the display unit 151 displays a UI (User Interface) or GUI (Graphic User Interface) relating to call. In the case that the electronic device 100 is in the video call mode or image capturing mode, the display unit 151 displays captured and/or received images or UIs or GUIs.

The display unit 151 may include at least one of a liquid crystal display, a thin film transistor liquid crystal display, an organic light emitting diode display, a flexible display, or a 3D display.

The display unit 151 may be configured in a transparent or light transmissive type, which may be called a "transparent display" examples of which include transparent LCDs. The display unit 151 may have a light-transmissive rear structure in which a user may view an object positioned behind the terminal body through an area occupied by the display unit 151 in the terminal body.

According to an embodiment, two or more display units 151 may be included in the electronic device 100. For instance, the electronic device 100 may include a plurality of display units 151 that are integrally or separately arranged on a surface of the electronic device 100 or on respective different surfaces of the electronic device 100.

The display unit 151 may be logically divided into two or more regions.

When the display unit 151 and a sensor sensing a touch (hereinafter, referred to as a "touch sensor") are layered (this layered structure is hereinafter referred to as a "touch sensor"), the display unit 151 may be used as an input device as well as an output device. The touch sensor may include, for example, a touch film, a touch sheet, or a touch pad.

The touch sensor may be configured to convert a change in pressure or capacitance, which occurs at a certain area of the display unit 151, into an electrical input signal. The touch sensor may be configured to detect the pressure exerted during a touch as well as the position or area of the touch.

Upon touch on the touch sensor, a corresponding signal is transferred to a touch controller. The touch controller processes the signal to generate corresponding data and transmits the data to the control unit 180. By doing so, the control unit 180 may recognize the area of the display unit 151 where the touch occurred.

The proximity sensor 142 may be positioned in an inner area of the electronic device 100, which is surrounded by the touch screen, or near the touch screen. The proximity sensor 142 refers to a sensor that detects an object approaching a predetermined detection surface or present near the detection surface without physical contact using electromagnetic fields or infrared beams. The proximity sensor 142 has longer lifespan than a contact-type sensor and has more availability.

The proximity sensor 142 may include, but not limited to, a transmissive opto-electrical sensor, a direct reflective opto-electrical sensor, a mirror reflective opto-electrical sensor, a high frequency oscillating proximity sensor, a capacitive proximity sensor, a magnetic proximity sensor, or an IR proximity sensor.

If the touch screen is of a capacitive type, the proximity sensor 142 may detect the approach of a pointer depending on a variation of an electric field that occurs as the point gets close. The touch screen (touch sensor) may be classified as the proximity sensor.

Hereinafter, for ease of description, when a point is positioned near the touch screen while not in contact with the touch screen and it may be recognized that the point is positioned on the touch screen, it is represented as "proximity touch". When the point actually contacts the touch screen, it is represented as "contact touch". The position where the proximity touch to the point is done on the touch screen refers to a position where the pointer vertically corresponds to the touch screen when the pointer is subjected to the proximity touch. However, when the proximity touch need not be distinguished from the contact touch, the "touch" or "touch input" may refer to either an input by the proximity touch or an input by the contact touch.

The proximity sensor 142 senses a proximity touch and proximity touch pattern (for example, distance, direction, speed, time, position, or travelling state of the proximity touch). Information corresponding to the sensed proximity touch operation and proximity touch pattern may be displayed on the touch screen.

The sound output module 152 may output audio data received from the wireless communication unit 110 in a call signal receiving mode, call mode, or recording mode, voice recognition mode, or broadcast receiving mode or stored in the memory 160. The sound output module 152 outputs sound signals relating to functions performed in the electronic device 100 (for example, signaling call signal reception or message reception). The sound output module 152 may include a receiver, a speaker, or a buzzer.

The alarm unit 153 outputs signals for signaling an event occurring in the electronic device 100. The event may include reception of call signals or messages, entry of key signals, or touch input. The alarm unit 153 may also output signals for signaling occurrence of an event, for example, by vibration which is of other types than video or audio signals. The video or audio signals may be output through the display unit 151 or the sound output module 152.

The haptic module 154 generates various tactile effects that may be sensed by a user. A representative example of a tactile effect generated by the haptic module 154 includes vibration. The strength or pattern of vibration generated by the haptic module 154 may be controlled. For example, different types of vibration may be mixed and output or sequentially output.

The haptic module 154 may generate an effect coming from a stimulus made by a pin array moving perpendicular to the contact skin surface, an effect coming from a stimulus by jet or suction force of air through an inlet or suction port, an effect coming from a stimulus created when a skin surface is rubbed, an effect coming from a stimulus made by contact with an electrode, an effect coming from a stimulus by an electrostatic force, or an effect coming from reproduction of warm or cool feeling using a heat absorption or generation element.

The haptic module 154 may transfer the tactile effects through a direct contact and may be configured to provide tactile effects through muscle sense of a user's finger or arm. Two or more haptic modules 154 may be provided depending on configuration of the electronic device 100.

The memory 160 may store a program for operation of the control unit 180 and may temporarily store input/output data (for example, phone books, messages, still images, or videos). The memory 160 may store data relating to various patterns of vibration and sounds that are output when touch input is made on the touch screen.

The memory 160 may include at least one storage medium of flash memory types, hard disk types, multimedia card micro types, card type memories (e.g., SD or XD memories), RAMs (Random Access Memories), SRAM (Static Random Access Memories), ROMs (Read-Only Memories), EEPROMs (Electrically Erasable Programmable Read-Only Memories), PROM (Programmable Read-Only Memories), magnetic memories, magnetic discs, and optical discs. The electronic device 100 may operate in association with a web storage performing a storage function of the memory 160 over the Internet.

The interface unit 170 functions as a path between the electronic device 100 and any external device connected to the electronic device 100. The interface unit 170 receives data or power from an external device and transfers the data or power to each component of the electronic device 100 or enables data to be transferred from the electronic device 100 to the external device. For instance, the interface unit 170 may include a wired/wireless headset port, an external recharger port, a wired/wireless data port, a memory card port, a port connecting a device having an identification module, an audio I/O (Input/Output) port, a video I/O port, and an earphone port.

The identity module is a chip storing various types of information to authenticate the authority for using the electronic device 100 and may include a user identity module (UIM), a subscriber identity module (SIM), a universal subscriber identity module (USIM), or the like. A device having the identity module (hereinafter, "identity device") may be implemented as a smart card so that the identity device may be connected to the electronic device 100 through a port.

The interface unit may serve as a path through which power is supplied from an external cradle to the electronic device 100 when the cradle is connected to the electronic device 100 or a path through which various command signals are supplied from the cradle to the electronic device 100 by a user. The various command signals and he power from the cradle may function as signals that allow the user to notice that the electronic device 100 is correctly coupled with the cradle.

The control unit 180 controls the overall operation of the electronic device 100. For example, the control unit 180 performs control and process relating to voice call, data communication, or video call. The control unit 180 may include a multimedia module 181 for playing multimedia. The multimedia module 181 may be implemented in the control unit 180 or may be provided separately from the control unit 180.

The control unit 180 may perform pattern recognition process that allows handwriting or drawing on the touch screen to be recognized as text or images.

The power supply 190 receives external/internal power under the control of the control unit 180 and feeds the power to other components.

The embodiments herein may be implemented in software, hardware, or a combination thereof, and may be recorded in a recording medium that may be read b a computer or its similar device.

When implemented in hardware, the embodiments may be implemented as at least one of ASICs (application specific integrated circuits), DSPs (digital signal processors), DSPDs (digital signal processing devices), PLDs (programmable logic devices), FPGAs (field programmable gate arrays, processors, controllers, microcontrollers, microprocessors, or electrical units for performing the functions.

When implemented in software, the processes, functions, or the embodiments may be implemented together with a separate software module that may perform at least one function or operation. The software code may be implemented as a software application that has been written in proper program language. The software code may be stored in the memory 160 and executed by the control unit 180.

An environment where an electronic device applies according to an embodiment of the present invention is now described.

Figure 2:
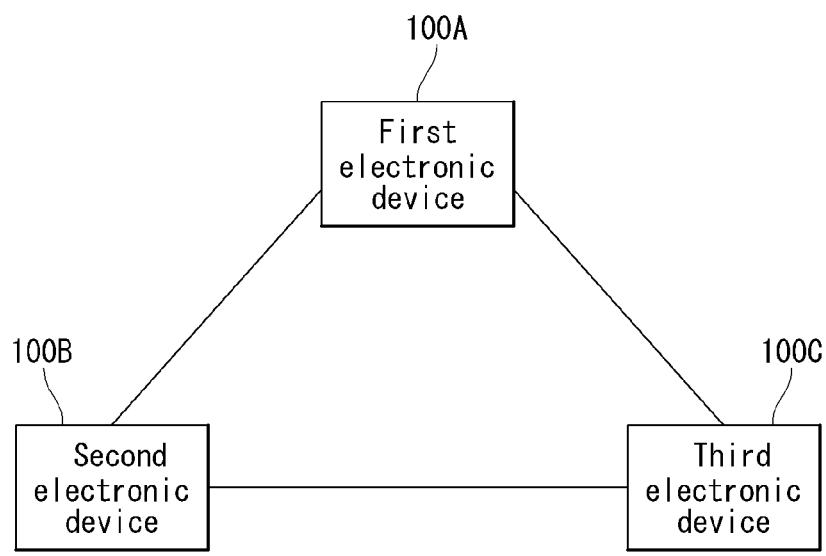
FIGS. 2 to 4 illustrate an environment of an electronic device according to an embodiment of the present invention.
Figure 3:
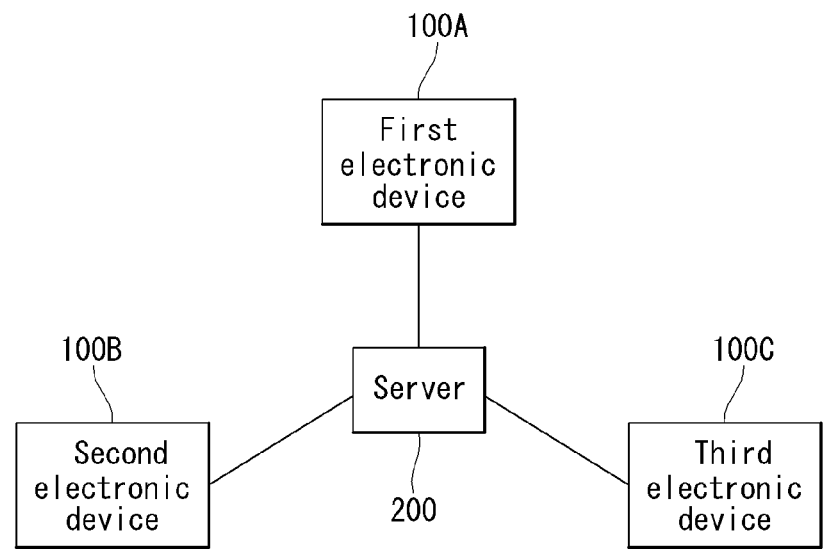
Figure 4:
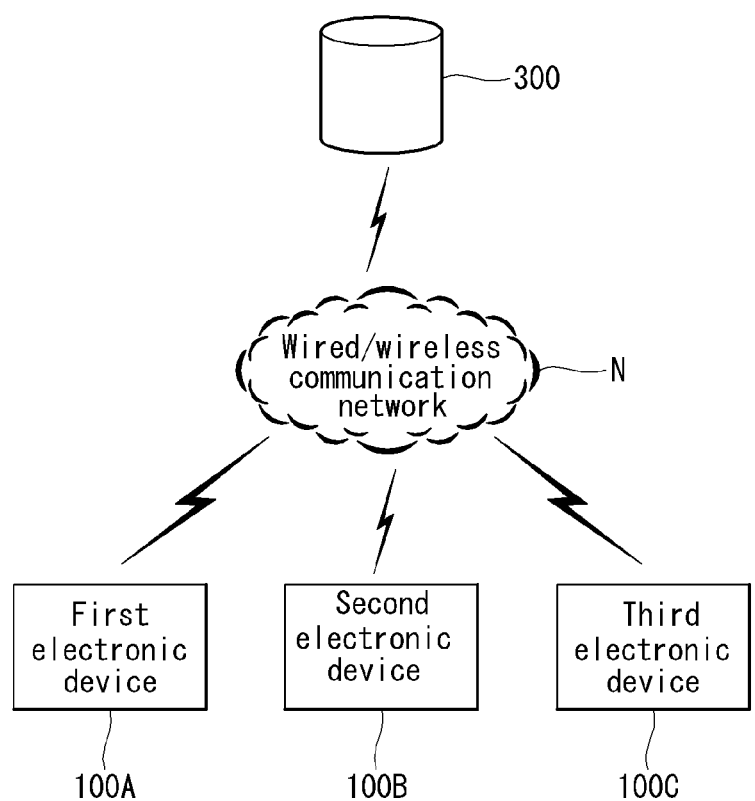

FIGS. 2 to 4 illustrate an environment where an electronic device applies according to an embodiment of the present invention. For convenience of description, the terms "first electronic device", "second electronic device", and/or "third electronic device" may be used, each of which may include the same or substantially the same configuration as the electronic device 100 described in connection with FIG. 1. According to an embodiment, each of the first to third electronic devices may include more or less components than the components of the electronic device 100 illustrated in FIG. 1.

Referring to FIG. 2, electronic devices 100A, 100B, and 100C may be directly connected to each other. For example, the first electronic device 100A may be directly connected to the second or third electronic devices 100B and 100C, and the second electronic device 100B may be directly connected to the third electronic device 100C.

The connections between the electronic devices 100A, 100B, and 100C may be made physically or wirelessly. For example, a wired LAN or USB cable may be used for connection between the electronic devices 100A, 100B, and 100C. Also, wireless interfaces, such as WiFi, WiGig, WiHD, or ZigBee, may be used for such connection. As shown in FIG. 2, when the electronic devices 100A, 100B, and 100C are directly connected to each other, at least one of the devices 100A, 100B, and 100C may function as a network manager that manages a network established by the devices 100A, 100B, and 100C.

Referring to FIG. 3, the electronic devices 100A, 100B, and 100C may be connected to each other via a server 200. For example, the first electronic device 100A is indirectly connected to the electronic devices 100A and 100B through the server 200, and the second electronic device 100B is indirectly connected to the third electronic device 100C through the server 200.

Connection between the server and the electronic devices 100A, 100B, and 100C may be made physically or wirelessly as shown in FIG. 2. As shown in FIG. 3, when the electronic devices 100A, 100B, and 100C are connected to each other via the server 200, the server 200 may function as a network manager that manages a network established by the electronic devices 100A, 100B, and 100C.

Referring to FIG. 4, the electronic devices 100A, 100B, and 100C may be connected to a remote server 300 via a wired/wireless communication network that is established for remote communication, so that the first electronic device 100A may be indirectly connected to the second and third electronic devices 100B and 100C, and the second electronic device 100B may be indirectly connected to the third electronic device 100C. The electronic devices 100A, 100B, and 100C and the server 300 may be connected to each other through the Internet, a mobile network, or other known communication networks.

Although three electronic devices 100A, 100B, and 100C are connected to each other as shown in FIGS. 2 to 4, the embodiments of the present invention are not limited thereto. According to an embodiment, two, or four or more electronic devices may be connected to each other.

According to an embodiment, when a predetermined event occurs while audio data is played through the sound output module 152 of each of the electronic device 100A, 100B, or 100C connected to each other, one of the electronic devices 100A, 100B, and 100C is selected (hereinafter, the selected one is referred to as "selected device" or "selected electronic device") and the selected device pulls in audio data generated from the other electronic devices (which are also referred to as "relating devices" or "relating electronic devices") outputting content associated with content being output through the selected device.

Accordingly, the selected electronic device may output the audio data received from the relating devices as well as the audio data generated from the selected electronic device.

When the predetermined event occurs, the relating devices may stop outputting the audio data associated with the relating devices through the external sound output device connected to the relating devices and/or the sound output modules 152 of the relating devices and may transmit the audio data generated from the relating devices to the selected device.

Figure 5:
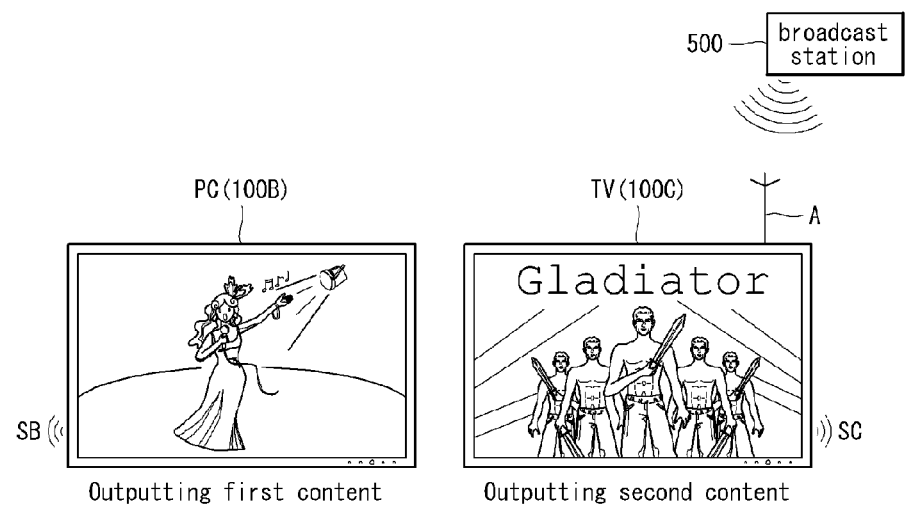
FIGS. 5 to 8 illustrate an embodiment of the present invention.

FIGS. 5 to 8 illustrate an embodiment of the present invention. Referring to FIG. 5, the second electronic device 100B (hereinafter, assume that the second electronic device 100B is a PC) outputs a sound SB corresponding to second audio data AD2 generated from the second electronic device 100B, and the third electronic device 100C (hereinafter, assume that the third electronic device 100C is a television) outputs a sound SC corresponding to audio data generated from the third electronic device 100C.

In particular, the second electronic device 100B visually outputs a first content stored in the memory 160 of the second electronic device 100B through the display module 151 or audibly outputs the first content through the sound output module 152, and the third electronic device 100C visually outputs a second content transmitted from a broadcast station 500 as a broadcast signal through the display module 151 or audibly outputs the second content through the sound output module 152.

Figure 6:
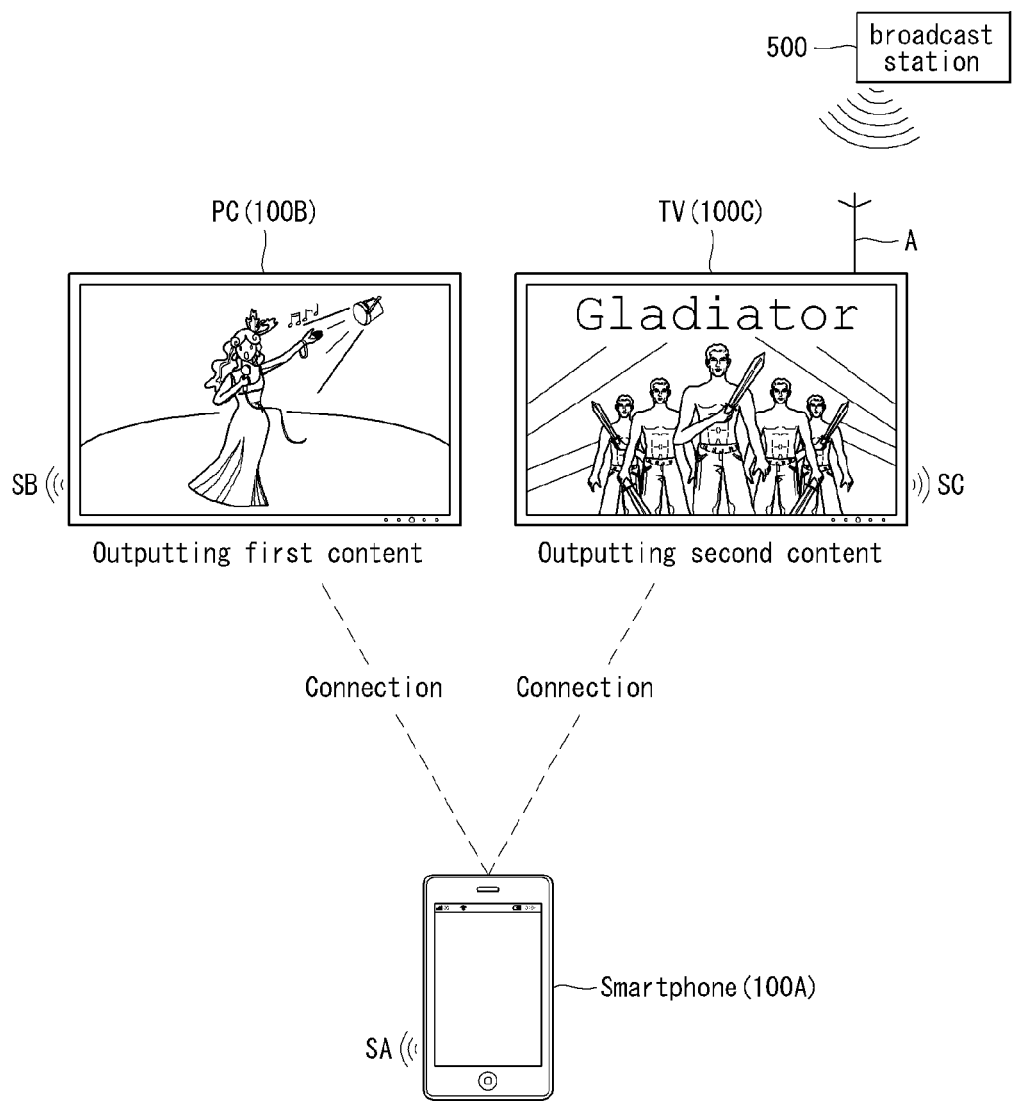

As shown in FIG. 6, the first electronic device 100A may establish a connection with the second electronic device 100B and/or the third electronic device 100C (hereinafter, assume that the third electronic device 100C is a smartphone). Similar to the above-described second electronic device 100B and/or third electronic device 100C, the first electronic device 100A may also output the sound SA corresponding to the first audio data AD1 associated with the first electronic device 100A through the sound output module 152 of the first electronic device 100A.

Figure 7:
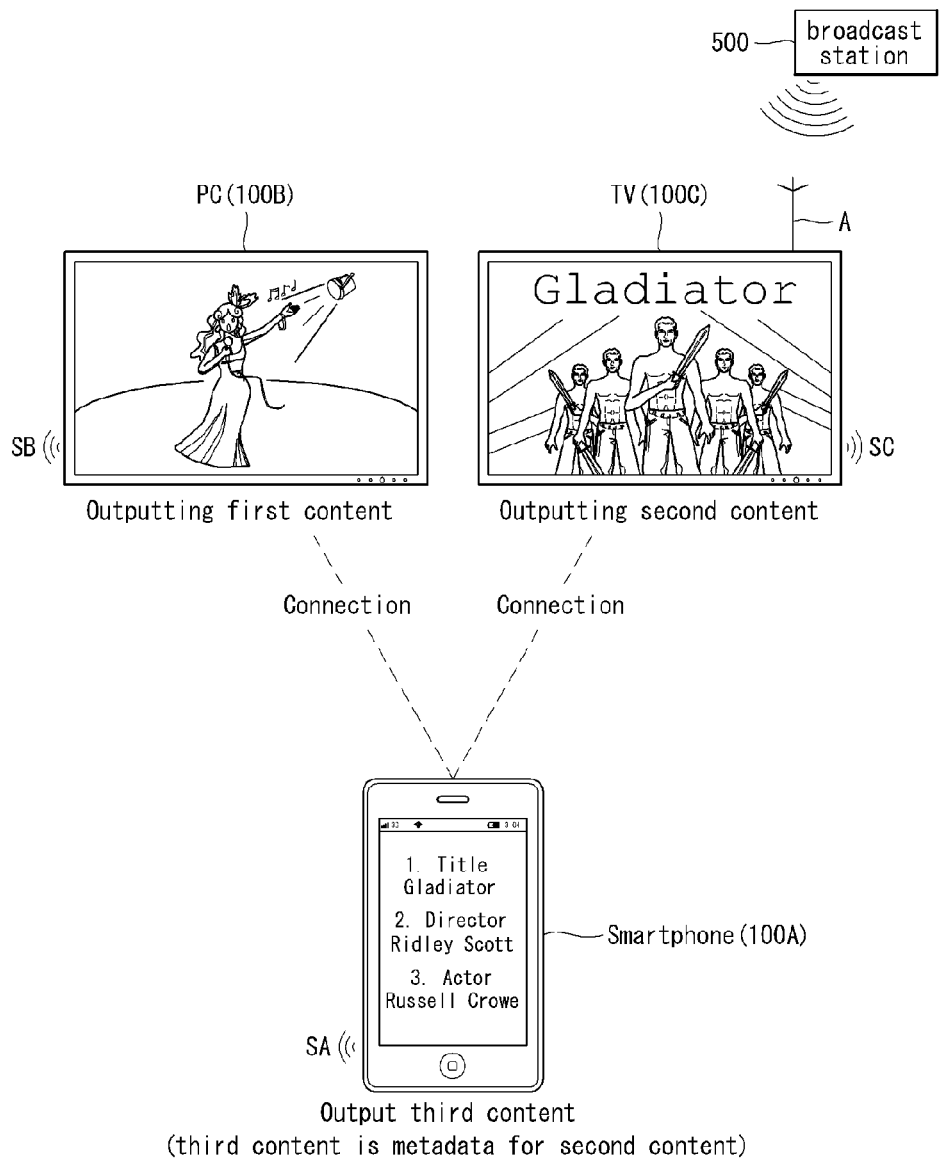

Under the situation illustrated in FIG. 6, in response to a user's request and/or the operation of a system and/or application of the first electronic device 100A, the first electronic device 100A, as shown in FIG. 7, may visually output through the display module 151 a third content associated with the second content or the first content or may audibly output through the sound output module 152 the third content. For example, the third content may be metadata associated with the second content being output through the third electronic device 100C.

The "metadata" may have a wide meaning. As used herein, the "metadata for a particular content" refers to information describing the specific content and/or a diversity of visual and/or audible objects included in the specific content. As illustrated in FIG. 7, when the second content being output through the third electronic device 100C is a movie, Gladiator, the third content output through the first electronic device 100A may include information on the title, director, or actors of the second content. Further, the third content may include information on the soundtrack included in the second content, information on the place being visually displayed by the second content, or information on products being visually displayed by the second content.

Figure 8:
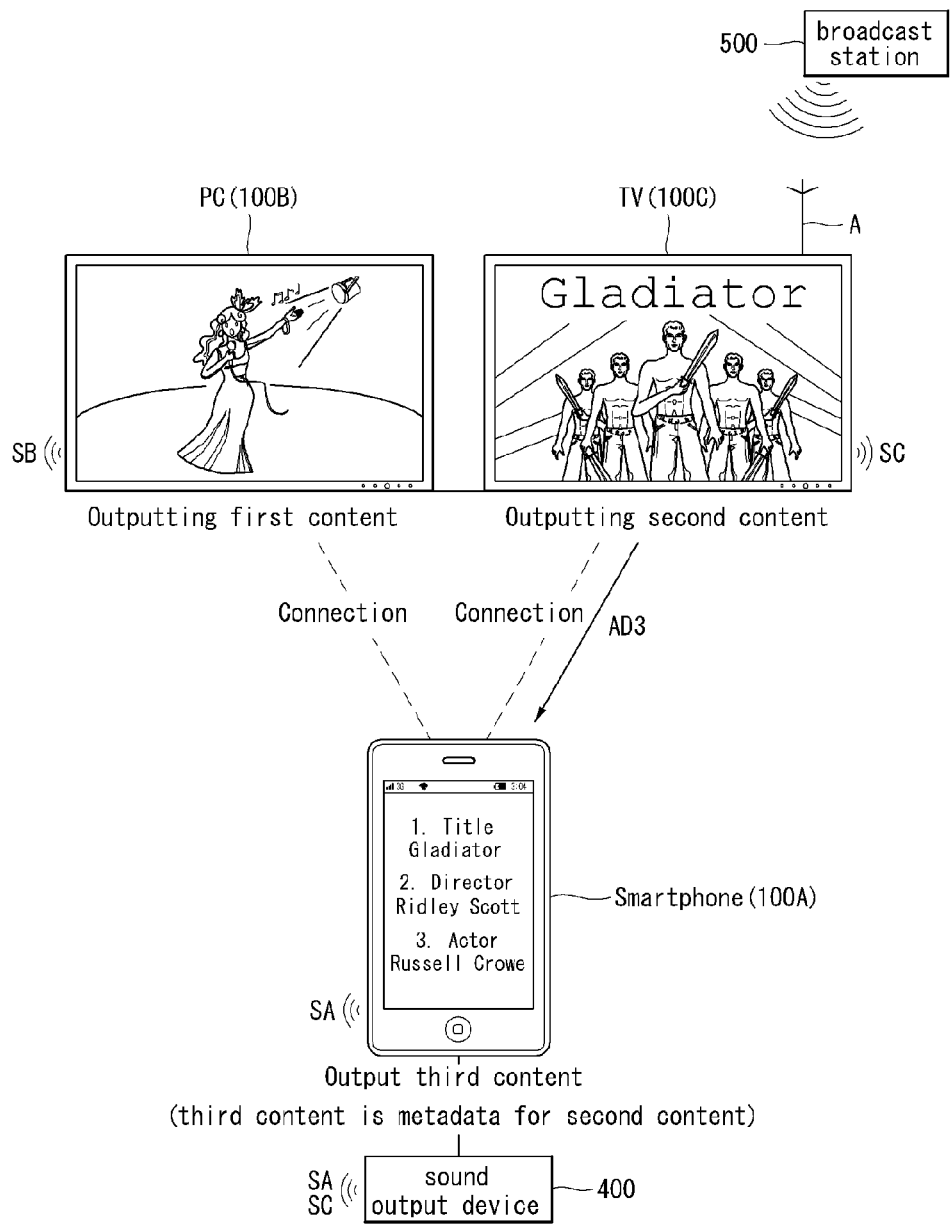

As shown in FIG. 7, when the predetermined event occurs in the first electronic device 100A while the electronic devices 100A, 100B, and 100C respectively output the first to third contents, the third electronic device 100C outputting the second content associated with the third content being output through the first electronic device 100A may transmit the third audio data AD3 associated with the third electronic device 100C to the first electronic device 100A as shown in FIG. 8, and the first electronic device 100A may output the transmitted third audio data AD3 through the sound output module 152 of the first electronic device 100A and/or the external sound output device connected to the first electronic device 100A.

The predetermined event may be one of various events. For example, the predetermined event may include a connection of an external sound output device or a user's request through key entry or touching.

FIG. 8 illustrates an example where the predetermined event is connection of an external sound output device. For example, after the external sound output device 400 is connected to the first electronic device 100A, the third audio data AD3 generated from the third electronic device 100C outputting the second content associated with the third content is transmitted from the third electronic device 100C to the first electronic device 100A, and the first electronic device 100A may output the third sound SC corresponding to the third audio data AD3 through the external sound output device 400.

The external sound output device may be any type of device, such as an earphone, speaker, or Bluetooth headset, which may audibly transfer sounds to a user.

As used herein, the "audio data generated from electronic device(s)" collectively refers to overall audio data to be output through the sound output module(s) 152 of the electronic device(s) and/or sound output device(s) connected to the electronic device(s) by a system of the electronic device(s) and/or an application executed in the electronic device(s). For example, the audio data includes audio data (system alarm/alert sound, etc.) generated by the operation of the system of the electronic device or audio data (sound of content played by an application, such as media player, or message receipt sound output by a message application) generated by the operation of an application in execution by the electronic device. The "audio data generated from electronic device(s)" may be also referred to as "audio data associated with electronic device(s)".

As used herein, the phrase "output audio data" refers to externally outputting a sound corresponding to sound data stored in an analog or digital format through the sound output module 152 of the electronic device and/or a sound output device connected to the electronic device so that the sound can be audibly recognized.

Figure 9:
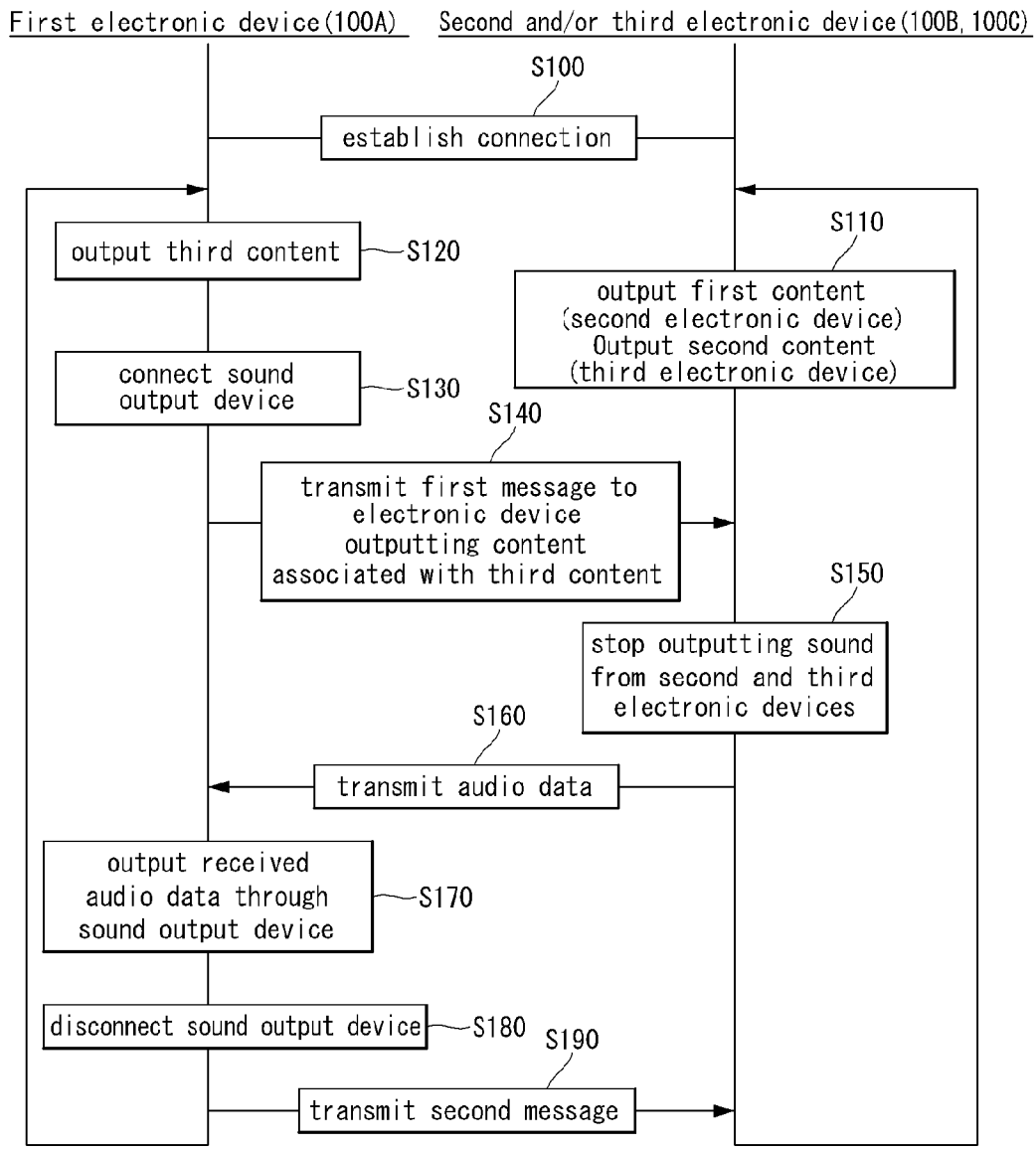
FIG. 9 is a flowchart illustrating a method of controlling an electronic device according to an embodiment of the present invention.

FIG. 9 is a flowchart illustrating a method of controlling an electronic device according to an embodiment of the present invention. Referring to FIG. 9, the first electronic device 100A is connected to the second electronic device 100B and/or the third electronic device 100C (S100). As described in connection with FIGS. 2 to 4, various methods of connecting the first electronic device 100A to the devices 100B and/or 100C may be adopted.

Before or after the connection formation in step S100, the second electronic device 100B and the third electronic device 100C respectively may be outputting the first content and the second content (S110).

Subsequently, the first electronic device 100A may output the third content (S120). The third content may be associated with the first or second content. For example, the third content may be metadata for the first content or metadata for the second content.

Subsequently, the first electronic device 100A may sense a connection between the first electronic device 100A and an external sound output device 400 (S130). The first electronic device 100A may sense such connection by various methods.

When an earphone and/or speaker are connected through an output port of an electronic device to the electronic device, the electronic device may detect the connection to the earphone and/or speaker via the output port. For example, the moment the earphone and/or speaker is connected to the output port, an interrupt occurs which causes audio data generated from the electronic device to be output through the earphone and/or speaker connected to the output port. The first electronic device 100A may sense connection of the external sound output device 400 based on occurrence of an interrupt (S130).

For example, a Bluetooth technology may be used for wireless connection with the external sound output device. In the Bluetooth technology, the operation of an electronic device attempting to connect with a sound output device is called "pairing" through which the electronic device may identify the type of the sound output device connected to the electronic device. For example, an electronic device may obtain information on whether another electronic device connected to the electronic device based on a Bluetooth technology is a desktop computer, a mobile terminal, such as a smartphone, or a sound output device, such as a Bluetooth headset. Accordingly, the first electronic device 100A may sense connection of the external sound output device 400 based on the pairing operation (S130).

When sensing the connection of the external sound output device 400, the first electronic device 100A may transmit the first message to an electronic device outputting content associated with the first content being output through the first electronic device 100A (S140). For example, when the third content is associated with the first content, the first electronic device 100A may transmit the first message to the second electronic device 100B, and when the third content is associated with the second content, the first electronic device 100A may transmit the second message to the third electronic device 100C. For convenience of description, assume that the third content is associated with the second content, and the first message is transmitted to the third electronic device 100C.

According to an embodiment, the first message may simply notify the non-selected devices 100B and 100C that the external sound output device 400 is connected to the first electronic device 100A. Alternatively, the first message may include a control signal requesting that the non-selected devices 100B and 100C send to the first electronic device 100A audio data generated after receiving the first message.

Accordingly, after receiving the first message, the third electronic device 100C may stop outputting the third audio data AD3 generated from the third electronic device 100C through the sound output module 152 of the third electronic device 100C (S150) and may transmit the whole third audio data AD3 associated with the third electronic device 100C to the first electronic device 100A (S160). For example, without outputting the audio data corresponding to the second content, the third electronic device 100C may transmit the audio data corresponding to the second content to the first electronic device 100A. In addition to the audio data corresponding to the second content, the audio data associated with the third electronic device 100C may include audio data generated by the operation of a system and/or application of the third electronic device 100C.

The third audio data AD3 transmitted from the third electronic device 100C to the third electronic device 100C is not limited to the audio data being output through the third electronic device 100C when the first message is received and may rather include all types of audio data that may be generated later from the third electronic device 100C. For example, audio data, such as a warning sound and/or user alarming sound generated by the operation of a system and/or application of the third electronic device 100C after the reception of the first message may also be transmitted to the first electronic device 100A.

When the third content is associated with the second content, the second electronic device 100B outputting the first content not associated with the third content does not receive the first message and accordingly continues to perform the operation without any influence. For example, without any control signal based on the operation of a system and/or application or entry of a user's request, the second electronic device 100B could continue to output the first content.

The audio data transmitted from the third electronic device 100C may be encoded audio data. Since the encoded audio data remains further compressed by a data compressing technology compared to when the data is decoded, data size deceases, thus resulting in more efficient data transmission. Unlike the general sound output devices, the third electronic device 100C can generally decode the encoded audio data on its own. Accordingly, transmission of such encoded audio data does not cause any technical problems. However, the transmitted audio data is not inevitably limited to the encoded audio data.

When receiving the third audio data AD3 from the third electronic device 100C, the first electronic device 100A may output a sound corresponding to the third audio data AD3 through a sound output device connected to the first electronic device 100A so that a user may audibly notice the sound (S170). For example, the sound SC corresponding to the third audio data AD3 transmitted from the third electronic device 100C may be output through the external sound output device 400 (e.g., an earphone) connected to the first electronic device 100A so that the sound may be audibly recognized by the user U.

When the third audio data AD3 is compressed (or encoded) digital audio data, the first electronic device 100A may decompress (or decode) the third audio data AD3 so that the audio data AD3 may be normally output through the external sound output device 400.

Rather than outputting only the sound corresponding to the third audio data AD3, the first electronic device 100A may also output a sound corresponding to the first audio data AD1 associated with the first electronic device 100A.

According to an embodiment, when the external sound output device 400 is connected to the first electronic device 100A, the first electronic device 100A, as described above, may transmit the first message to the third electronic device 100C. Or the first electronic device 100A may identify that the third electronic device 100C is outputting content associated with the third content and may then provide a window inquiring whether the user pulls in the audio data of the third electronic device 100C or not, so that the transmission of the first message is conducted only when the user confirms the pulling of the audio data.

Figure 10:
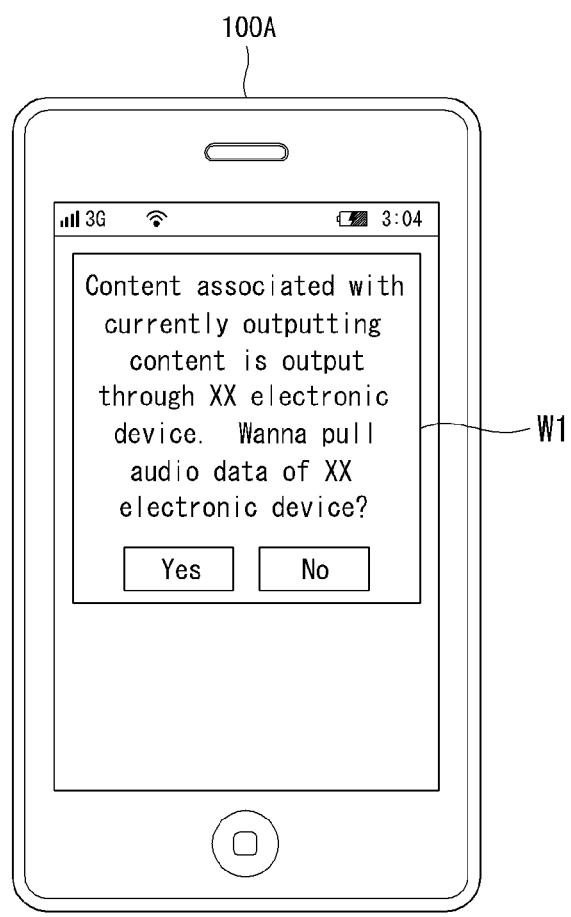
FIG. 10 illustrates a window inquiring that a user desires to pull in audio data according to an embodiment of the present invention.

For example, as shown in FIG. 10, which illustrates a window asking the user whether he pulls the audio data, after step S130 and before S140, a window W1 may pop up so that the user selects whether to perform the pulling function for the audio data.

When the first electronic device 100A is disconnected from the external sound output device 400 while the audio data AD1 and AD3 associated with the first and third electronic devices 100A and 100C is output through the external sound output device 400 connected to the first electronic device 100A, e.g., under the control of the first electronic device 100A (S180), the first electronic device 100A may transmit a second message to the third electronic device 100C (S190).

The second message may simply notify the third electronic device 100C that the external sound output device 400 is disconnected from the first electronic device 100A. The second message may include a control signal requesting that the third electronic device 100C output audio data generated after receiving the second message through the sound output module 152 of the third electronic device 100C.

Accordingly, the first to third electronic devices 100A, 100B, and 100C return to step S110 and/or S120 so that the first to third electronic devices 100A, 100B, and 100C respectively output the first audio data AD1 associated with the first electronic device 100A, the second audio data AD2 associated with the second electronic device, and the third audio data AD3 associated with the third electronic device.

A user who simultaneously uses a plurality of electronic devices (for example, the smartphone and TV shown in FIGS. 5 to 8) may easily obtain the audio data associated with the plurality of electronic devices through a sound output device (e.g., earphone) connected to one electronic device (e.g., the smartphone shown in FIGS. 5 to 8).

Without the need for switching on all of the electronic devices to obtain audio data from the electronic devices, a user may receive the audio data from all the electronic devices through an earphone connected to one of the electronic devices, thus preventing other users from being annoyed by the audio data generated from the electronic devices.

Rather than connecting an earphone to a television or PC, a user may connect the earphone to a portable electronic device, such as a smartphone, which is physically or wirelessly connected to the TV or PC, to receive audio data generated from the television or PC.

According to the embodiments, audio data of a particular one of a plurality of electronic devices networked to a corresponding electronic device may be pulled and output, the particular electronic device being associated with the corresponding electronic device. This may eliminate any inconvenience that causes a user to pull and output unnecessary audio data.

Other many effects may be achieved according to the embodiments of the present invention.

The embodiments are not limited to those described above and may be rather modified in various forms. Hereinafter, various modifications to the above-described embodiments are described.

<Predetermined Event>

First, various types of "predetermined events' are described. Although it has been illustrated in FIG. 9 that the predetermined event is connection between one electronic device and an external sound output device, the predetermined event is not limited thereto.

Referring to FIGS. 10 to 13 which illustrate the type of a predetermined event according to an embodiment of the present invention, the predetermined event is described below.

For example, among the electronic devices 100A, 100B, and 100C, one electronic device may recognize or sense a user's active input and/or its passive state through various user interfaces including a menu interface, a touch interface, a voice interface, or a motion interface, and may determine that a predetermined event occurs when a sensed result is identical to a predetermined input value or state value.

For example, when a user uses a menu tree structure provided by an electronic device to select "pulling function for audio data of other electronic devices", a corresponding electronic device may determine that a predetermined event occurs.

Figure 11:
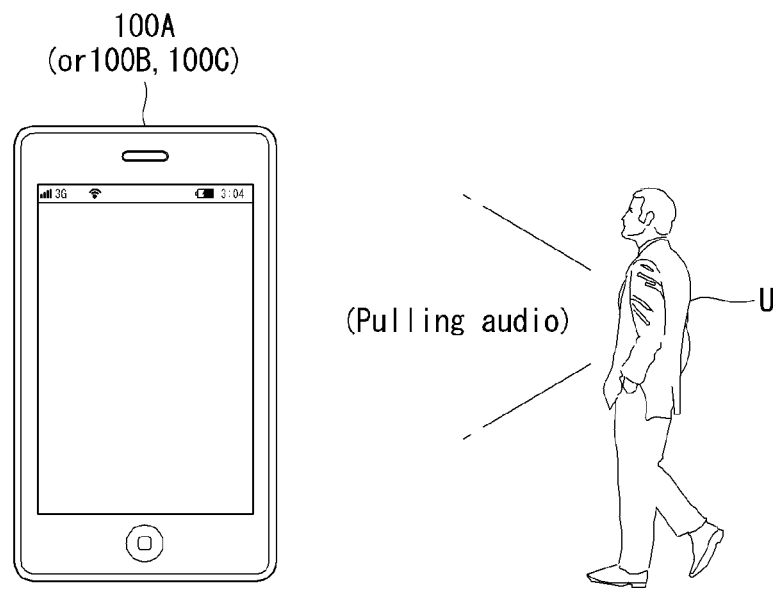
FIGS. 11 to 13 illustrate the type of a predetermined event according to an embodiment of the present invention.

As another example, as shown in FIG. 11, an electronic device may predefine a voice command (e.g. pulling audio) designated for "pulling function for audio data of other electronic devices," and when the designated voice command is input, may determine that a predetermined event occurs.

Figure 12:
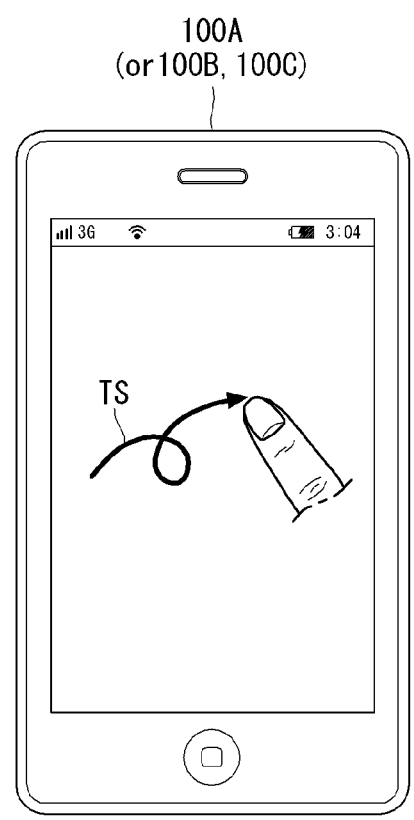
Figure 13:
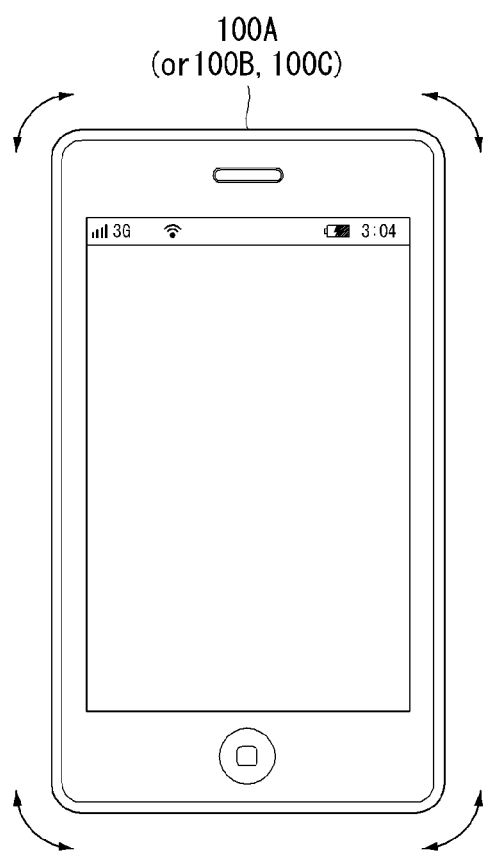

As still another example, an electronic device may predefine a particular touch stroke TS corresponding to "pulling function for audio data of other electronic devices" as shown in FIG. 12, and when the predetermined touch stroke TS is input, may determine that a predetermined event occurs. Subsequently, for example, as shown in FIG. 13, an electronic device may predetermine a motion (e.g., shaking as shown in FIG. 13) corresponding to "pulling function for audio data of other electronic devices," and when a user makes the predetermined motion with the electronic device, may determine that a predetermined event occurs. According to an embodiment, a predetermined event may be designated by various methods.

According to an embodiment, the predetermined event may also be designated by one or more combinations of the above-described or any other methods of designating a predetermined event. For example, when a user inputs a voice command, "pulling audio", to an electronic device and then shakes the electronic device, the electronic device may determine that a predetermined event occurs. As another example, when a user connects an external sound output device 400 to an electronic device and then selects "yes" in response to an inquiry asking "Do you want to perform a pulling function for audio data of other electronic devices?" on a confirmation window of the electronic device, the electronic device may determine that a predetermined event occurs.

As such, when a predetermined occurs in an electronic device, a corresponding electronic device (e.g., the first electronic device) may identify other electronic devices associated with outputting content, and the first message may be transmitted to the identified electronic devices.

<How First Electronic Device Identifies Relating Electronic Device?>

According to an embodiment, an electronic device (e.g., the first electronic device) where a predetermined event occurs needs to identify other electronic devices outputting content associated with the first content being output through the first electronic device 100A among a plurality of electronic devices connected to the first electronic device 100A.

FIGS. 14 to 17 illustrate a method of identifying an electronic device outputting the associated content according to an embodiment of the present invention. Referring to FIGS. 14 to 17, it is described how the first electronic device 100A identifies an electronic device outputting the associated content.

First, while viewing through the third electronic device 100C (e.g., a TV) a movie, Gladiator, which is content provided from a broadcast station, a user may desire to see additional information on the movie (e.g., metadata for the movie) through the first electronic device 100A (e.g., a smartphone).

The metadata may be provided from the broadcast station together with the movie content.

Under this situation, the user may request, by manipulating the third electronic device 100C, transmission of the metadata for the movie content to the first electronic device 100A, or by manipulating the first electronic device 100A, reception of the metadata for the movie content from the first electronic device 100A (in which case, the first electronic device 100A may request that the third electronic device 100C send the metadata to the third electronic device 100C, and in response, the third electronic device 100C may transmit the metadata to the first electronic device 100A)

Figure 14:
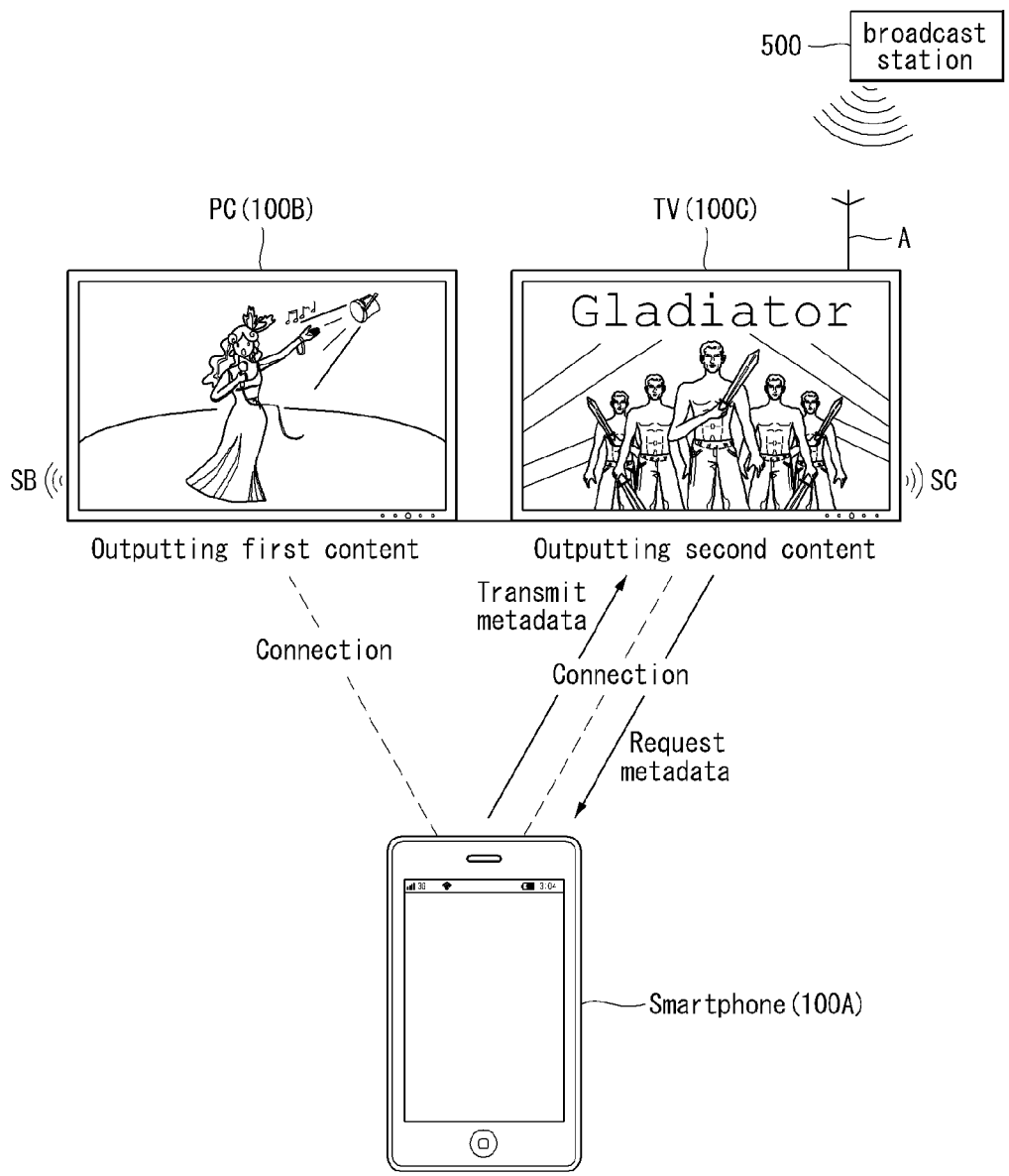
FIGS. 14 to 17 illustrate a method of identifying an electronic device outputting an associated content according to an embodiment of the present invention.

Regardless of whether the user manipulates the first electronic device 100A or the third electronic device 100C to output the metadata for the movie through the first electronic device 100A, under the above situation, the first electronic device 100A receives the metadata from the third electronic device 100C as shown in FIG. 14.

In such case, the first electronic device 100A is aware that the outputting content (e.g., the metadata for the broadcast content being output through the third electronic device 100C) is received from the third electronic device 100C, and may thus identify that an electronic device (e.g., the third electronic device 100C) transmitting the metadata to the first electronic device 100A is outputting content (e.g., main data for the metadata) associated with the content (e.g., the metadata) being output through the first electronic device 100A.

According to an embodiment, when the user may view through the third electronic device 100C (e.g., a TV) the movie "Gladiator" which is content provided from the broadcast station, no metadata for the movie may be transmitted from the broadcast station 500 while access information for accessing the metadata for the movie content may be instead transmitted from the broadcast station 500. The access information may include at least one of URL information for a server 600 that provides the metadata, information for identifying the metadata, information for identifying the movie content, and authentication information for accessing the metadata.

Figure 15:
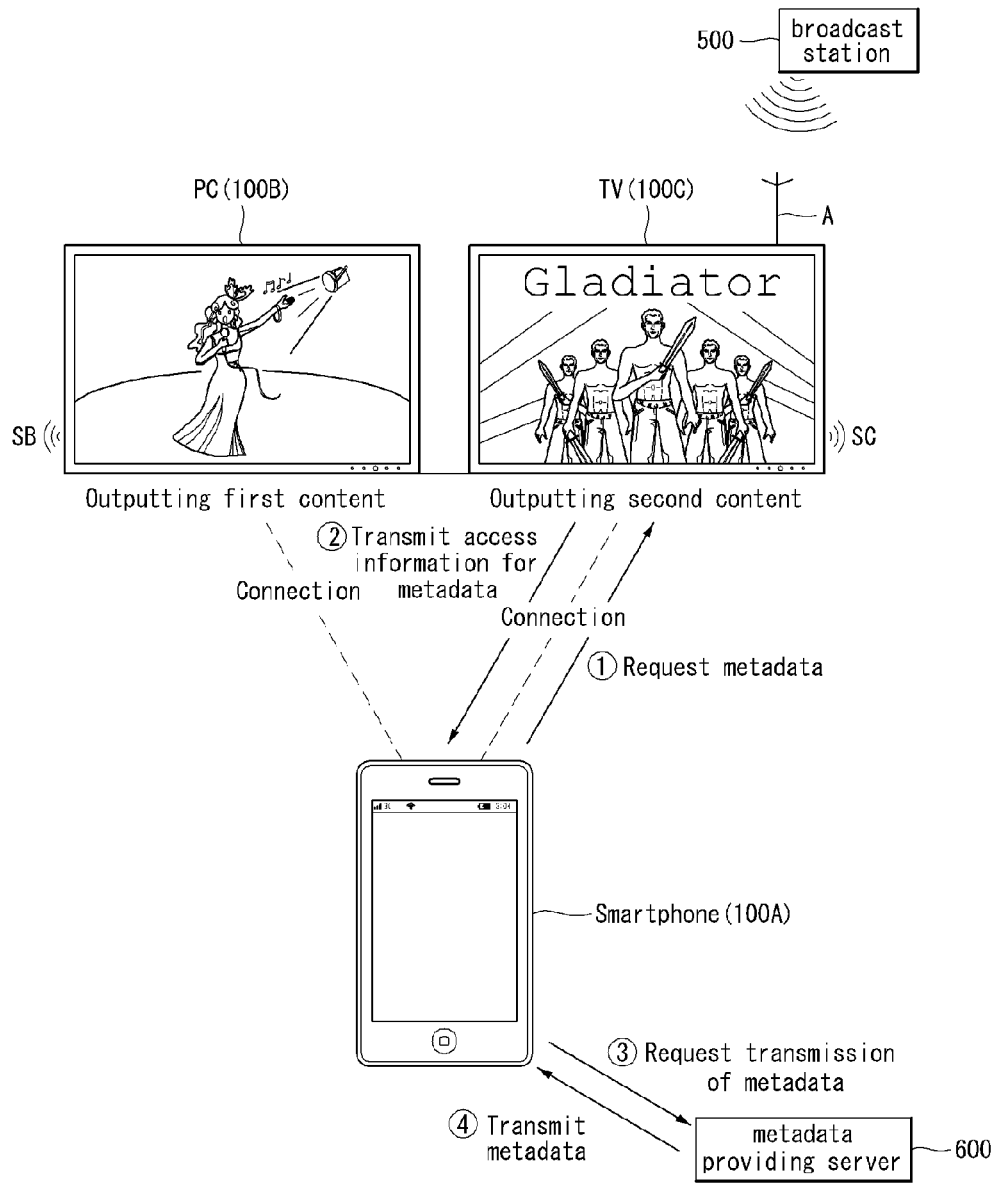
Figure 16:
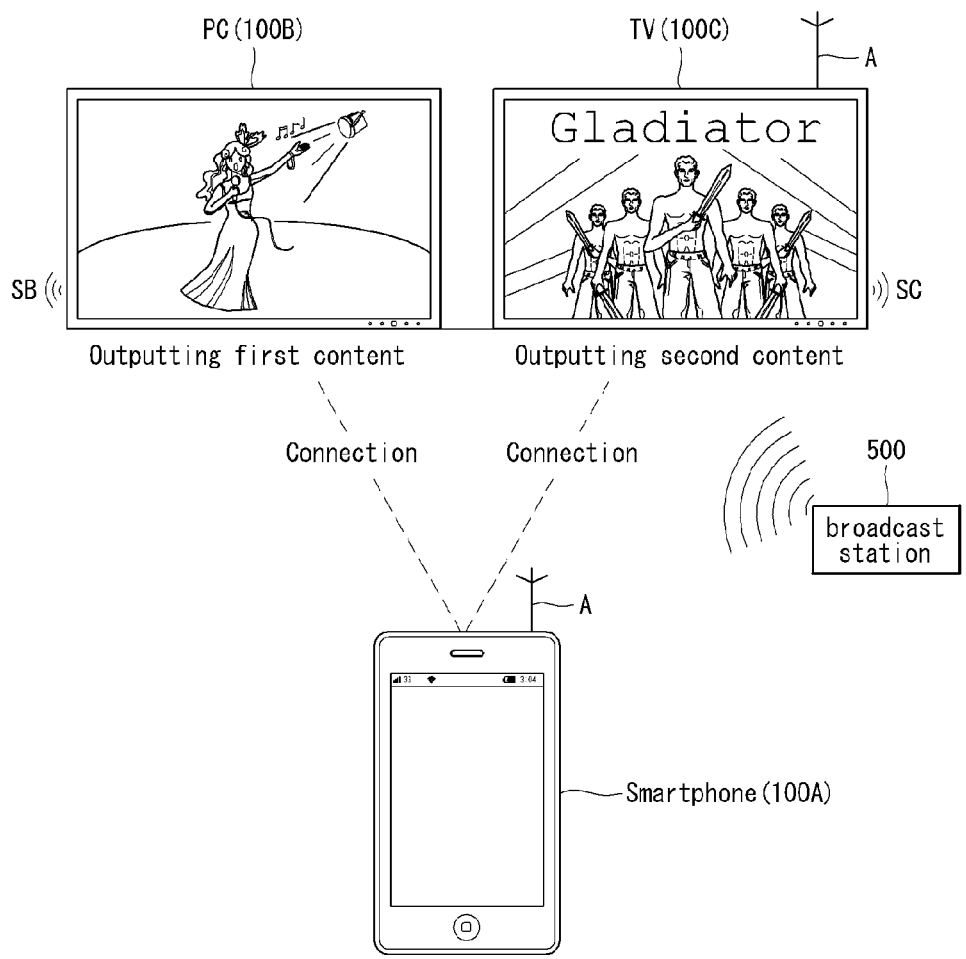

Under this situation, upon request that the third electronic device 100C sends the metadata to the first electronic device 100A, as shown in FIG. 15, the third electronic device 100C may transmit the access information for the metadata to the first electronic device 100A. Accordingly, the first electronic device 100A may access the server 600 to request the metadata for the movie content, so that the server 600 may transmit the metadata to the first electronic device 100A.

When receiving the access information for the content being output through the first electronic device 100A from the third electronic device 100C, the first electronic device 100A may determine that the third electronic device 100C providing the access information is outputting content (e.g., main data for the metadata) associated with the content (e.g., the metadata) being output through the first electronic device 100A.

In the above two cases, the third electronic device 100C intervenes to receive the content (e.g., the metadata) being output through the third electronic device 100C. However, without intervention of the third electronic device 100C, the first electronic device 100A may also output the content (e.g., the metadata) associated with the content being output through the third electronic device 100C.

When the movie content being output through the third electronic device 100C is a broadcast content provided from the broadcast station 500, the metadata for the broadcast content may be provided as a broadcast signal from the broadcast station together with the main movie content. Under this situation, the third electronic device 100C may output the movie content obtained through the broadcast signal, and the first electronic device 100A may output the metadata associated with the movie content as obtained through the broadcast signal. For example, this situation may happen when the user attempts to view the metadata associated with CH X through a smartphone (first electronic device) while watching the movie content provided over CH X through a television (third electronic device)

Figure 17:
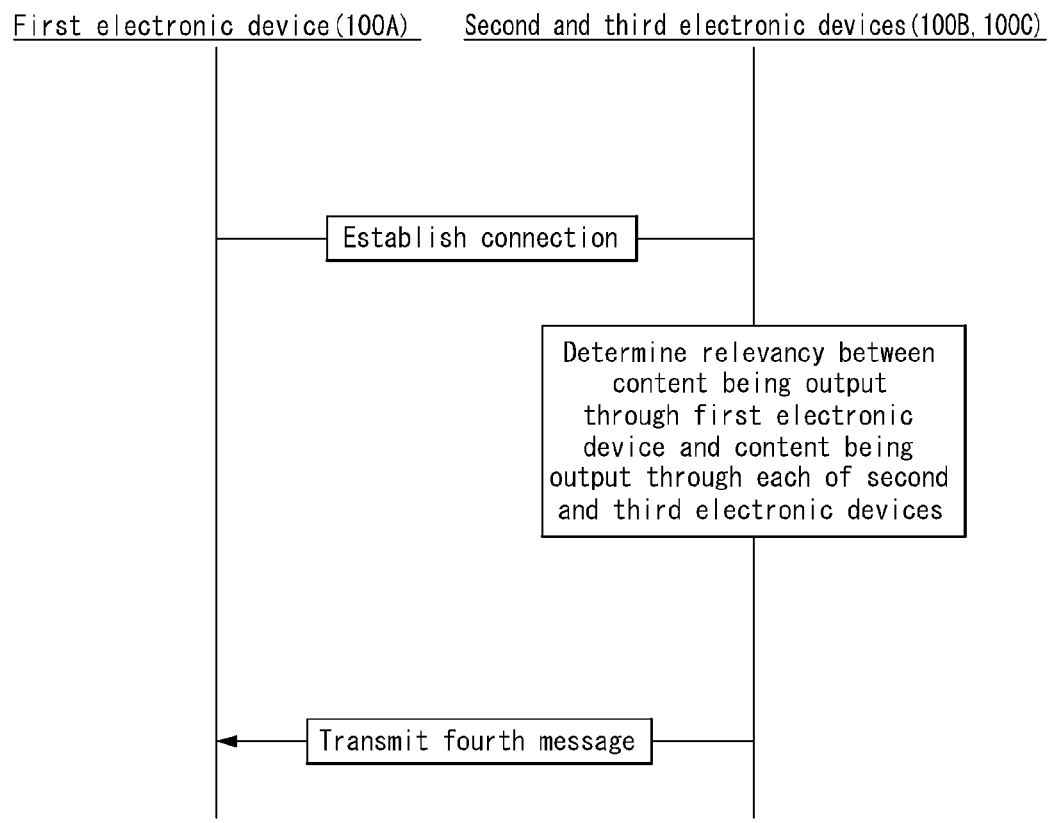

In such circumstances, as shown in FIG. 17, the first electronic device 100A may transmit the third message including information on content being currently output through the first electronic device 100A to all the electronic devices connected to the first electronic device 100A to obtain information on an electronic device outputting the content associated with the content being output through the first electronic device 100A (S200).

Receiving the third message, the other electronic devices may determine relevancy between the both based on information on content being output through the first electronic device 100A as obtained through the third message and information on content being output through the other electronic devices (S210). An electronic device determined to be associated with the first electronic device 100A may transmit a response message (fourth message) responding to the third message to the first electronic device 100A (S220). For example, when the second electronic device 100B and the third electronic device 100C receive the third message from the first electronic device 100A, either the second electronic device 100B or the third electronic device 100C may identify whether the content being output through the first electronic device 100A is associated with the content being output through the second electronic device 100B or the third electronic device 100C.

When it is determined that the content being output through the second electronic device 100B is not associated with the content being output through the first electronic device 100A, the second electronic device 100B does not respond to the third message. When it is determined that the content being output through the third electronic device 100C is associated with the content being output through the first electronic device 100A, the third electronic device 100C may transmit a response message in response to the third message. Accordingly, the first electronic device 100A may identify an electronic device associated with content being output by the first electronic device 100A based on the response message responding to the third message.

In the embodiments described in connection with FIGS. 14 to 17, the above-described examples may similarly apply to when the main content for the metadata is stored in a local device as well as when the main content is broadcast content.

For example, when a multimedia file stored in a PC (second electronic device which is a local device and contains metadata, the second electronic device 100B may transmit the metadata for content being output through the second electronic device 100B to the first electronic device 100A in response to a request from the first electronic device 100A and/or a user. As another example, when content being output through a PC (second electronic device) which is a local device is streamed from a home server (not shown) which is another local device and the home server contains metadata for the content being output, the second electronic device 100B may transmit access information on the metadata to the first electronic device 100A in response to a request from a user and/or the first electronic device 100A. By a similar method to those described above, the first electronic device 100A may identify a relating electronic device even for local content, but not for broadcast content.

<Solve Sync Problem Between Video and Audio Output Through Earphone of Second Electronic Device>

The audio data associated with non-selected electronic devices (e.g., second and third electronic devices 100B and 100C) is transmitted to a selected electronic device (e.g., the first electronic device 100A), and the audio data processed by the selected electronic device (e.g., the first electronic device 100A) may be output through the external sound output device 400 connected to the selected electronic device or the sound output module 152 of the selected electronic device.

According to an embodiment, the audio data associated with the second electronic device 100B may be associated with video data that is displayed in synchronization with the audio data. For example, in the case of a movie, audio and video data should be output while associated and synchronized with each other. When a system generates an alarming sound and/or warning sound and gives an audible feedback and/or notice (hereinafter, collectively "audible feedback") to a user or the system gives the user a visual feedback and/or notice (hereinafter, collectively "visual feedback") together with the alarming sound and/or warning sound, the audible feedback and the visual feedback may be output while synchronized with each other.

When audio data needed to be output while synchronized with video data is transmitted from the second electronic device 100B to the first electronic device 100A and output through the external sound output device 400 connected to the first electronic device 100A, a time of displaying the video data output through the second electronic device 100B (hereinafter, "video output time") may differ from a time of outputting the audio data associated with the video data through the first electronic device 100A (hereinafter, "audio output time") since there may be a delay for transmission of the audio data to the first electronic device 100A.

Figure 18:
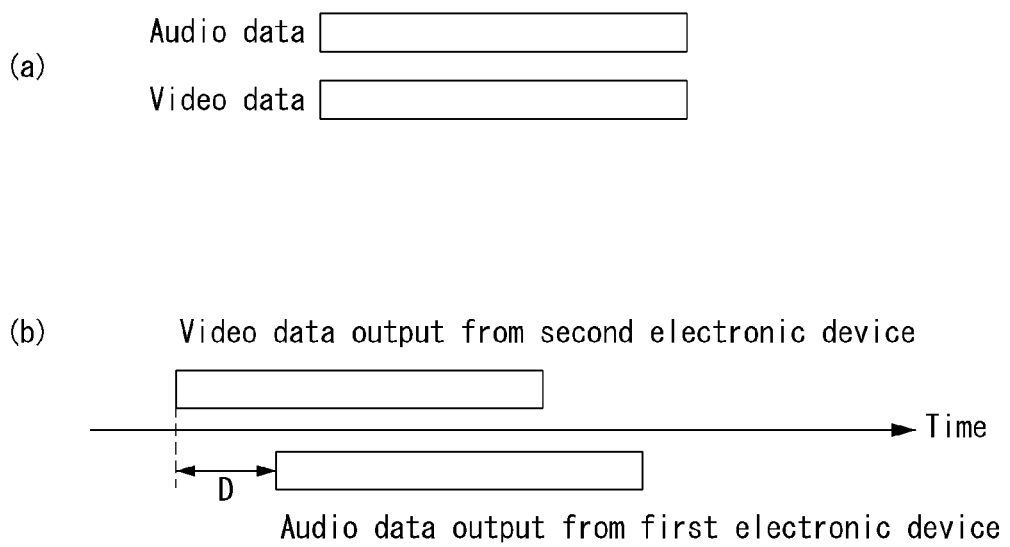
FIG. 18 illustrates a delay occurring upon transmission of audio data according to an embodiment of the present invention.

As a result, the video data output through the second electronic device 100B may be unsynchronized with the audio data output through the first electronic device 100A. FIG. 18 illustrates a delay created upon transmission of audio data according to an embodiment of the present invention. Image (a) of FIG. 18 illustrates audio and video data associated with each other.

For purposes of illustration, when audio and video data needed to be output while synchronized with each other as shown in image (a) of FIG. 18 is generated from the second electronic device 100B (e.g., audio and video data associated with the second electronic device 100B), the video data is output through the second electronic device 100B, and the audio data is transmitted to the first electronic device 100A and then output through the external sound output device 400 and/or the sound output module 152 of the first electronic device 100A.

Synchronization between the audio and video data may be distorted by a time (D, hereinafter, delay time by transmission) taken for the audio data to be transmitted to the first electronic device 100A. For example, as shown in image (b) of FIG. 18, audio data may be output the delay time D by transmission after a time when the video data starts to be output.

To establish sync between the video data displayed by the second electronic device 100B and the audio data output through the first electronic device 100A, the second electronic device 100B may delay a time of displaying the video data by the delay time D by transmission.

A method of obtaining the delay time D by transmission by the second electronic device 100B is briefly described. The second electronic device 100B may obtain a state of a network connected to the first electronic device 100A and a data transmission rate of the network to calculate a time taken for the audio data to be transmitted to the first electronic device 100A.

The second electronic device 100B may keep sensing the state of the network and data transmission rate of the network. According to an embodiment, when receiving the first message, the second electronic device 100B may transmit a particular message to the first electronic device 100A to identify the state of connection with the first electronic device 100A and may receive a response message for the particular message transmitted from the first electronic device 100A. The second electronic device 100B may calculate the connection state and/or data transmission rate in consideration with a time of transmitting the particular message and a time of receiving the response message.

To readjust sync between the video data displayed through the second electronic device 100B and the audio data output through the first electronic device 100A, the second electronic device 100B may receive a predetermined input from the second electronic device 100B and gradually delay the time of displaying the video data based on the predetermined input.

For example, when a user makes a particular input, the first electronic device 100A may output the video data with the video data delayed by a predetermined time interval according to the particular input. When the user makes the particular input twice, the second electronic device 100B may output the video data with the video data delayed by double the predetermined time interval.

Figure 19:
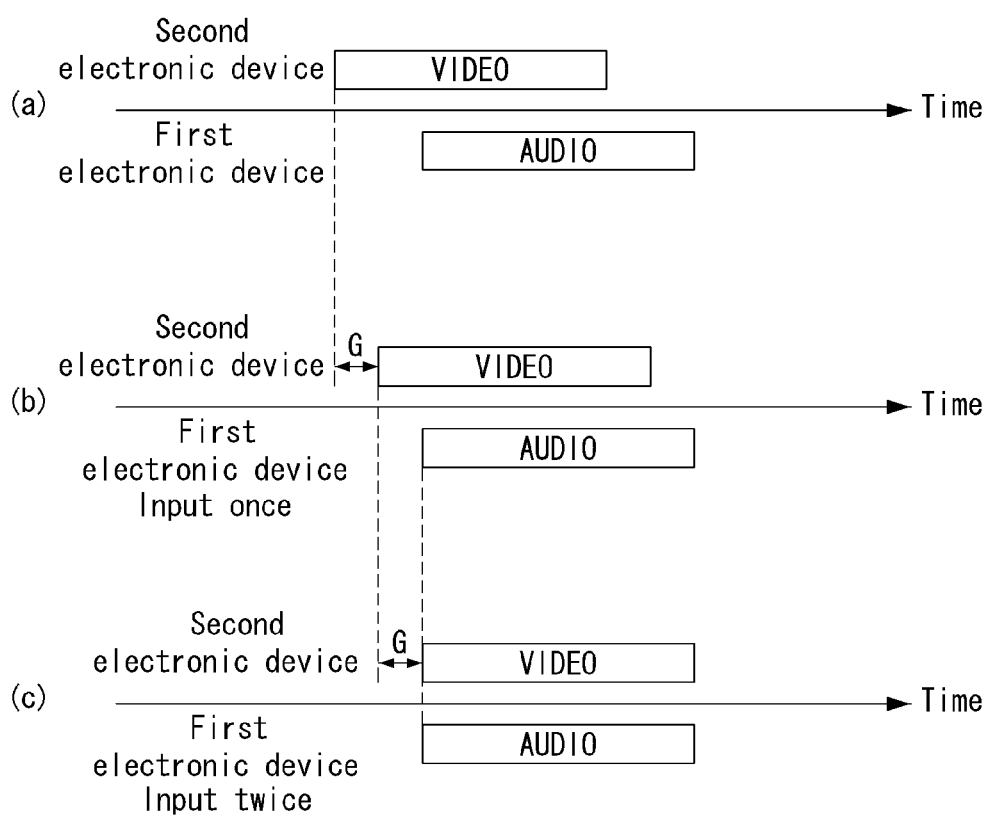
FIG. 19 illustrates a method of recovering sync distortion that may occur according to an embodiment of the present invention.

FIG. 19 illustrates a method of recovering a sync distortion according to an embodiment of the present invention. Image (a) of FIG. 19 illustrates that a sync distortion occurs between video and audio data according to an embodiment. When a user makes a particular input once, the second electronic device 100B may output the video data with the video data delayed by a predetermined time interval G (image (b) of FIG. 19), and when the user makes the particular input again under the above situation (e.g., when the user makes the particular input twice), the second electronic device 100B delays further by the time interval G in the state shown in image (b) of FIG. 19, outputting the video data (image (c) of FIG. 19).

Based on the above-described method, the distorted sync between the video and audio data may be recovered. Although it is illustrated in FIG. 19 that the particular input is done two times to recover the distorted sync, according to an embodiment, the distorted sync may be recovered by making the particular once or three times or more.

<Solve Problem Occurring when Another User Controls TV; e.g., Display of Indicator>

When audio data associated with the second and/or third electronic device 100B and/or 100C is output through the external sound output device 400 connected to the first electronic device 100A, e.g., under the control of the first electronic device 100A, or the sound output module 152 of the first electronic device 100A, the second electronic device 100B and/or the third electronic device 100C may display an indicator which includes a symbol or a combination of symbols to indicate that the audio data associated with the second electronic device 100B and/or the third electronic device 100C is being transmitted to the first electronic device 100A.

Figure 20:
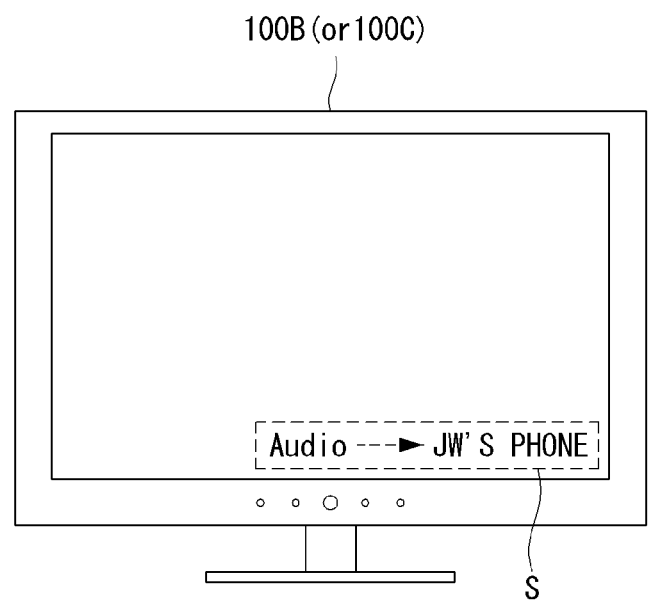
FIG. 20 illustrates an indicator displayed when audio data is transmitted to other electronic devices according to an embodiment of the present invention.

FIG. 20 illustrates an indicator which is displayed when audio data is transmitted to another electronic device according to an embodiment of the present invention. As shown in FIG. 20, the second electronic device 100B and/or the third electronic device 100C may display the indicator S through the display module 151 of the second electronic device 100B or the third electronic device 100C. Referring to FIG. 20, other users may easily notice that the audio data associated with the second electronic device 100B and/or the third electronic device 100C is being transmitted to "JW's Phone".

As such, the indicator S allows other users to be able to easily notice transmission of audio data to other electronic devices.

According to an embodiment, the indicator S may remain displayed when the second and/or third electronic device 100B or 100C transmits audio data to the first electronic device 100A. Alternatively, the indicator S may be displayed only when a user's control request (e.g., the user's input for adjusting sound volume of the second and/or third electronic device) occurs on the second and/or third electronic device 100B or 100C. For example, when the user performs user's input for adjustment of sound volume through various user interfaces of the second and/or third electronic device 100B or 100C, the second and/or the third electronic device 100B or 100C may display the indicator S only for a predetermined time so that other users may notice transmission of the audio data of the second and/or third electronic device 100B or 100C.

FIG. 20 illustrates that information is also displayed to indicate transmission of the audio data of the second and/or third electronic device 100B or 100C as well as to allow an electronic device receiving the audio data to be identified. According to an embodiment, the information for identifying an electronic device receiving the audio data may be excluded from the information that may be provided by the indicator. Alternatively, more information may be included in the information that may be provided by the indicator.

<In Case that Content Selected by First Electronic Device Changes from Metadata to Other Contents>

As described above, according to an embodiment, when the first electronic device 100A outputs metadata and the second electronic device 100B outputs a main content for the metadata, as the external sound output device 400 is connected to the first electronic device 100A, audio data (e.g., a sound corresponding to the main content) associated with the second electronic device 100B is transmitted to the first electronic device 100A.

According to an embodiment, a user may change contents to be output through the first electronic device 100A from the metadata to other contents (e.g., metadata for content different from the main content, other main contents, etc.). For example, the output of the metadata by the first electronic device 100A may be stopped and other contents may start to be output through the first electronic device 100A.

Under this situation, according to an embodiment, the electronic device may be controlled as follows.

First, even when contents to be output through the first electronic device 100A change, audio data associated with the second electronic device 100B may continue to be pulled and output through a sound output device connected thereto.

Second, it is identified whether there is audio data corresponding to the changed content. When there is any audio data, the audio data of the second electronic device 100B continues to be pulled, and when there is no audio data, the audio data of the second electronic device 100B stops being pulled.

Third, when contents output through the first electronic device 100A change, the first electronic device 100A may provide a user interface which allows a user to enter whether to continue to pull the audio data of the second electronic device 100B, and may determine whether to continue or stop pulling the audio data depending on the user's entry through the user interface.

Finally, the first electronic device 100A may identify whether the changed content is metadata or not. When the changed content is metadata, the first electronic device 100A may identify another electronic device outputting the main content associated with the changed metadata and may pull the audio data of the identified electronic device again. Identifying the other electronic device outputting the main content associated with the changed metadata and pulling the audio data may be conducted by the above-described methods.

In the method of controlling an electronic device according to the present invention, each step in each embodiment is not inevitable, and each embodiment may selectively include the steps therein. The steps in each embodiment are not necessarily performed in the order described above, and for example, a later step may be performed earlier than an earlier step.

The control method may be stored in a computer readable recording medium in the form of a code or program.

The invention has been explained above with reference to exemplary embodiments. It will be evident to those skilled in the art that various modifications may be made thereto without departing from the broader spirit and scope of the invention. Further, although the invention has been described in the context its implementation in particular environments and for particular applications, those skilled in the art will recognize that the present invention's usefulness is not limited thereto and that the invention can be beneficially utilized in any number of environments and implementations. The foregoing description and drawings are, accordingly, to be regarded in an illustrative rather than a restrictive sense.

What is claimed is:

1. An electronic device configured to be connected to at least one external electronic device, the electronic device comprising:
    a display unit;
    a communication unit configured to perform data communication with the at least one external electronic device;
    an interface unit configured to connect to a sound output device; and
    a controller connected to the display unit, the communication unit and the interface unit, wherein the controller is configured to:
    display a first content on the display unit, wherein the first content is associated with a second content which is being displayed on a first external electronic device of the at least one external electronic device,
    receive first audio data of the second content from the first external electronic device, only when the connection of the sound output device to the interface unit is detected while the electronic device displays the first content on the display unit,
    output the first audio data through the sound output device,
    after receiving the first audio data of the second content from the first external electronic device, receive second audio data which is generated by the first external electronic device, and output the second audio data through the sound output device, wherein the second audio data is not associated with the second content, and
    when the displayed first content is changed to a third content which is not associated with the second content, continue to output the first audio data through the sound output device.

2. The electronic device of claim 1, wherein the controller is further configured to identify whether a fourth audio data corresponding to the third content exist.

3. The electronic device of claim 2, wherein the controller is further configured to provide a user interface which allows a user to enter whether to continue to output the first audio data of the second content of the first external electronic device.

4. The electronic device of claim 1, wherein the controller is further configured to transmit a first message to the at least one external electronic device, the first message requesting transmission of the first audio data of the second content.

5. The electronic device of claim 1, wherein the controller is further configured to detect the first external electronic device from the at least one external electronic device that is displaying the second content.

6. The electronic device of claim 5, wherein the controller is further configured to detect the first external electronic device from the at least one external electronic device, the first external electronic device streaming the first content.

7. The electronic device of claim 5, wherein the controller is further configured to determine that the first external electronic device is providing access information for accessing the first content.

8. The electronic device of claim 5, wherein the controller is further configured to:
    transmit a second message to the at least one external electronic device, the second message including information on the first content, and
    upon receiving a response message to the second message, identify the first external electronic device from the at least one external electronic device.

9. The electronic device of claim 1, wherein the first content includes metadata for the second content.

10. The electronic device of claim 1, wherein the first audio data includes encoded audio data.

11. The electronic device of claim 1, wherein, when the displaying of the first content associated with the second content is stopped, the controller is further configured to continue to receive the first audio data from the first external electronic device and to output the first audio data through the sound output device.

12. The electronic device of claim 1, wherein, when the displaying of the first content associated with the second content is stopped, the controller is further configured to provide a user interface to determine whether to continue to receive the first audio data.

13. The electronic device of claim 1, wherein the controller is further configured to output third audio data together with the first audio data through the sound output device, the third audio data being associated with the electronic device.

14. A method of controlling an electronic device connected to at least one external electronic device, the method comprising:
- displaying, on a display unit of the electronic device, a first content, wherein the first content is associated with a second content which is being displayed on a first external electronic device of the at least one external electronic device;
- receiving first audio data of the second content from the first external electronic device, only when the connection of a sound output device to the electronic device is detected while the electronic device displays the first content on the display unit;
- outputting the first audio data through the sound output device;
- after receiving the first audio data of the second content from the first external electronic device, receiving second audio data which is generated by the first external electronic device, and outputting the second audio data through the sound output device, wherein the second audio data is not associated with the second content; and
- when the displayed first content is changed to a third content which is not associated with the second content, maintaining output of the first audio data through the sound output device.

15. The method of claim 14, further comprising identifying whether a fourth audio data corresponding to the third content exist.

16. The method of claim 15, further comprising providing a user interface which allows a user to enter whether to continue to output the first audio data of the second content of the first external electronic device.

17. The method of claim 14, further comprising detecting the first external electronic device from the at least one external electronic device that is displaying the second content.

18. The method of claim 17, wherein the detecting step includes detecting the first external electronic device from the at least one external electronic device, the first external electronic device streaming the first content.

19. The method of claim 17, wherein the detecting step includes determining that the first external electronic device is providing access information for accessing the first content.

20. The method of claim 14, further comprising outputting third audio data together with the first audio data, the third audio data being associated with the electronic device.

21. The method of claim 14, further comprising:
- transmitting a first message to the at least one external electronic device, the first message requesting transmission of the first audio data of the second content.

22. The method of claim 14, wherein the first content includes metadata for the second content.

23. The method of claim 14, wherein the first audio data includes encoded audio data.

24. The method of claim 14, further comprising:
- when the displaying of the first content associated with the second content is stopped, continuing to receive the first audio data from the first external electronic device, and
- outputting the first audio data through the sound output device.

25. The method of claim 14, further comprising:
- when the displaying of the first content associated with the second content is stopped, providing a user interface to determine whether to continue to receive the first audio data.

26. The method of claim 17, further comprising:
- transmitting a second message to the at least one external electronic device, the second message including information on the first content, and
- upon receiving a response message to the second message, identifying the first external electronic device from the at least one external electronic device.

* * * * *